US009857573B2

(12) United States Patent
Noda

(10) Patent No.: US 9,857,573 B2
(45) Date of Patent: Jan. 2, 2018

(54) ZOOM LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/268,864

(22) Filed: Sep. 19, 2016

(65) Prior Publication Data

US 2017/0090170 A1    Mar. 30, 2017

(30) Foreign Application Priority Data

Sep. 28, 2015 (JP) ................................ 2015-189934

(51) Int. Cl.
| | |
|---|---|
| *G02B 15/14* | (2006.01) |
| *G02B 15/173* | (2006.01) |
| *G02B 5/00* | (2006.01) |
| *G02B 27/00* | (2006.01) |
| *G02B 27/64* | (2006.01) |

(52) U.S. Cl.
CPC ........... *G02B 15/173* (2013.01); *G02B 5/005* (2013.01); *G02B 27/0025* (2013.01); *G02B 27/646* (2013.01)

(58) Field of Classification Search
CPC .... G02B 15/173; G02B 27/646; G02B 5/005; G02B 27/0025

USPC .................................. 359/676, 758, 683
See application file for complete search history.

(56) References Cited

U.S. PATENT DOCUMENTS

| | | | |
|---|---|---|---|
| 2005/0190447 A1 | 9/2005 | Misaka | |
| 2006/0119939 A1 | 6/2006 | Misaka | |
| 2014/0176778 A1* | 6/2014 | Kim ..................... | G02B 15/173 348/335 |

FOREIGN PATENT DOCUMENTS

| | | |
|---|---|---|
| JP | 4585776 B2 | 11/2010 |
| JP | 2013-097322 A | 5/2013 |
| JP | 2014-209144 A | 11/2014 |

* cited by examiner

*Primary Examiner* — Alicia M Harrington
(74) *Attorney, Agent, or Firm* — Studebaker & Brackett PC

(57) ABSTRACT

A zoom lens is constituted by, in order from the object side: a positive first lens group; a negative second lens group; a positive third lens group; a positive fourth lens group; a negative fifth lens group, and a positive sixth lens group. The distances among adjacent lens groups change when changing magnification from the wide angle end to the telephoto end. The first lens group is constituted by, in order from the object side, a negative lens, a positive lens, and a positive lens. The second lens group has a negative 2R lens group constituted by a cemented lens formed by cementing a negative lens and a positive lens, provided in this order from the object side, together, and a negative single lens. The fifth lens group is constituted by, in order from the object side, a negative lens, a negative lens, and a positive lens.

20 Claims, 17 Drawing Sheets

FIG.3 EXAMPLE 3

ZOOM LENS AND IMAGING APPARATUS

CROSS REFERENCE TO RELATED APPLICATIONS

The present application claims priority under 35 U.S.C. §119 to Japanese Patent Application No. 2015-189934 filed on Sep. 28, 2015. The above application is hereby expressly incorporated by reference, in its entirety, into the present application.

BACKGROUND

The present disclosure is related to a zoom lens which is particularly favorably suited for use in digital cameras, interchangeable lens digital cameras, and cinematic cameras. The present disclosure is also related to an imaging apparatus equipped with the zoom lens.

Zoom lenses use in digital cameras, interchangeable lens digital cameras, and cinematic cameras are known, as disclosed in Japanese Unexamined Patent Publication Nos. 2013-097322 and 2014-209144, as well as Japanese Patent No. 4585776.

SUMMARY

Recently, the number of pixels in digital cameras, interchangeable lens digital cameras, and cinematic cameras is increasing. Therefore, there is demand for a high performance lens, which is compatible with the increased number of pixels, and that favorably corrects various aberrations, as a zoom lens to be employed in these cameras. However, it cannot be said that the zoom lenses of Japanese Unexamined Patent Publication Nos. 2013-097322 and 2014-209144, and Japanese Patent No. 4585776 have sufficient performance with respect to correcting various aberrations.

The present disclosure has been developed in view of the foregoing circumstances. The present disclosure provides a zoom lens which favorably corrects various aberrations. The present disclosure also provides an imaging apparatus equipped with such a zoom lens.

A first zoom lens of the present disclosure consists of, in order from the object side to the image side:
  a first lens group having a positive refractive power;
  a second lens group having a negative refractive power;
  a third lens group having a positive refractive power;
  a fourth lens group having a positive refractive power;
  a fifth lens group having a negative refractive power; and
  a sixth lens group having a positive refractive power;
  the first lens group moving toward the object side, the distance between the first lens group and the second lens group increasing, the distance between the second lens group and the third lens group decreasing, the distance between the third lens group and the fourth lens group changing, the distance between the fourth lens group and the fifth lens group changing, and the distance between the fifth lens group and the sixth lens group changing, when changing magnification from the wide angle end to the telephoto end;
  the first lens group consisting of, in order from the object side to the image side, a negative 1A lens, a positive 1B lens, and a positive 1C lens;
  the second lens group having a 2R lens group having a negative refractive power as a whole and consisting of a cemented lens formed by cementing a negative lens and a positive lens, which are provided in this order from the object side to the image side, together, and a negative single lens; and
  the fifth lens group consisting of, in order from the object side to the image side, a negative 5A lens, a negative 5B lens, and a positive 5C lens.

In the zoom lens of the present disclosure, it is preferable for Conditional Formula (1) below to be satisfied. Note that it is more preferable for Conditional Formula (1-1) below to be satisfied.

$$-0.3 < f2/f1 < -0.1 \tag{1}$$

$$-0.25 < f2/f1 < -0.15 \tag{1-1}$$

wherein $f2$ is the paraxial focal length with respect to the d line of the second lens group, and $f1$ is the paraxial focal length with respect to the d line of the first lens group.

In addition, it is preferable for Conditional Formula (2) below to be satisfied. Note that it is more preferable for Conditional Formula (2-1) below to be satisfied.

$$-0.9 < f2/f3 < -0.6 \tag{2}$$

$$-0.8 < f2/f3 < -0.7 \tag{2-1}$$

wherein $f2$ is the paraxial focal length with respect to the d line of the second lens group, and $f3$ is the paraxial focal length with respect to the d line of the third lens group.

In addition, it is preferable for the second lens group to have a 2F lens group that includes a cemented lens formed by cementing a positive lens and a negative lens, provided in this order from the object side to the image side, together, adjacent to the 2R lens group at the object side thereof.

In addition, it is preferable for Conditional Formula (3) below to be satisfied. Note that it is more preferable for Conditional Formula (3-1) below to be satisfied.

$$0.8 < f2/f2R < 1.4 \tag{3}$$

$$1 < f2/f2R < 1.25 \tag{3-1}$$

wherein $f2$ is the paraxial focal length with respect to the d line of the second lens group, and $f2R$ is the paraxial focal length with respect to the d line of the 2R lens group.

In addition, it is preferable for the 2R lens group to be moved in a direction perpendicular to the optical axis in order to correct for camera shake.

In addition, it is preferable for the fifth lens group to move toward the image side when changing focus from that on an object at infinity to that on an object at a most proximal distance.

In addition, it is preferable for Conditional Formula (4) below to be satisfied. Note that it is more preferable for Conditional Formula (4-1) below to be satisfied.

$$-0.25 < f5/f1 < -0.05 \tag{4}$$

$$-0.2 < f5/f1 < -0.1 \tag{4-1}$$

wherein $f5$ is the paraxial focal length with respect to the d line of the fifth lens group, and $f1$ is the paraxial focal length with respect to the d line of the first lens group.

In addition, it is preferable for Conditional Formula (5) below to be satisfied. Note that it is more preferable for Conditional Formula (5-1) below to be satisfied.

$$0.8 < f5A/f5 < 1.3 \tag{5}$$

$$0.9 < f5A/f5 < 1.2 \tag{5-1}$$

wherein $f5A$ is the paraxial focal length with respect to the d line of the negative 5A lens, and $f5$ is the paraxial focal length with respect to the d line of the fifth lens group.

In addition, it is preferable for Conditional Formula (6) below to be satisfied. Note that it is more preferable for Conditional Formula (6-1) below to be satisfied.

$$45 < (vd5A + vd5B)/2 < 80 \qquad (6)$$

$$50 < (vd5A + vd5B)/2 < 75 \qquad (6-1)$$

wherein vd5A is the Abbe's number with respect to the d line of the negative 5A lens, and vd5B is the Abbe's number with respect to the d line of the negative 5B lens.

In addition, it is preferable for the third lens group to have a 3A cemented lens, in which a positive lens and a negative lens provided in this order from the object side to the image side are cemented together, and a 3B cemented lens, in which a positive lens and a negative lens provided in this order from the object side to the image side are cemented together.

In addition, it is preferable for a stop to be positioned adjacent to the third lens group toward the image side thereof, and for the stop to move integrally with the third lens group when changing magnification.

In addition, it is preferable for the sixth lens group to consist of a positive 6A lens.

An imaging apparatus of the present disclosure is equipped with a zoom lens of the present disclosure described above.

Note that the expression "consists of" means that the zoom lens of the present disclosure may also include lenses that practically have no power, optical elements other than lenses such as a stop, a mask, a cover glass, and filters, and mechanical components such as lens flanges, a lens barrel, an imaging element, a camera shake correcting mechanism, etc., in addition to the constituent elements listed above.

In addition, the surface shapes of lenses as well as the signs of the refractive powers of lenses are those which are considered in the paraxial region for lenses that include aspherical surfaces.

The zoom lens of the present disclosure consists of, in order from the object side to the image side: the first lens group having a positive refractive power; the second lens group having a negative refractive power; the third lens group having a positive refractive power; the fourth lens group having a positive refractive power; the fifth lens group having a negative refractive power; and the sixth lens group having a positive refractive power. The first lens group moves toward the object side, the distance between the first lens group and the second lens group increases, the distance between the second lens group and the third lens group decreases, the distance between the third lens group and the fourth lens group changes, the distance between the fourth lens group and the fifth lens group changes, and the distance between the fifth lens group and the sixth lens group changes, when changing magnification from the wide angle end to the telephoto end. The first lens group consists of, in order from the object side to the image side, a negative 1A lens, a positive 1B lens, and a positive 1C lens. The second lens group has a 2R lens group having a negative refractive power as a whole and consisting of a cemented lens formed by cementing a negative lens and a positive lens, which are provided in this order from the object side to the image side, together, and a negative single lens. The fifth lens group consists of, in order from the object side to the image side, a negative 5A lens, a negative 5B lens, and a positive 5C lens. Therefore, it is possible for the zoom lens to be that which favorably corrects various aberrations.

The imaging apparatus of the present disclosure is equipped with the zoom lens of the present disclosure. Therefore, the imaging apparatus can obtain images having high image quality.

DETAILED DESCRIPTION OF THE PREFERRED EMBODIMENTS

Figure 1:
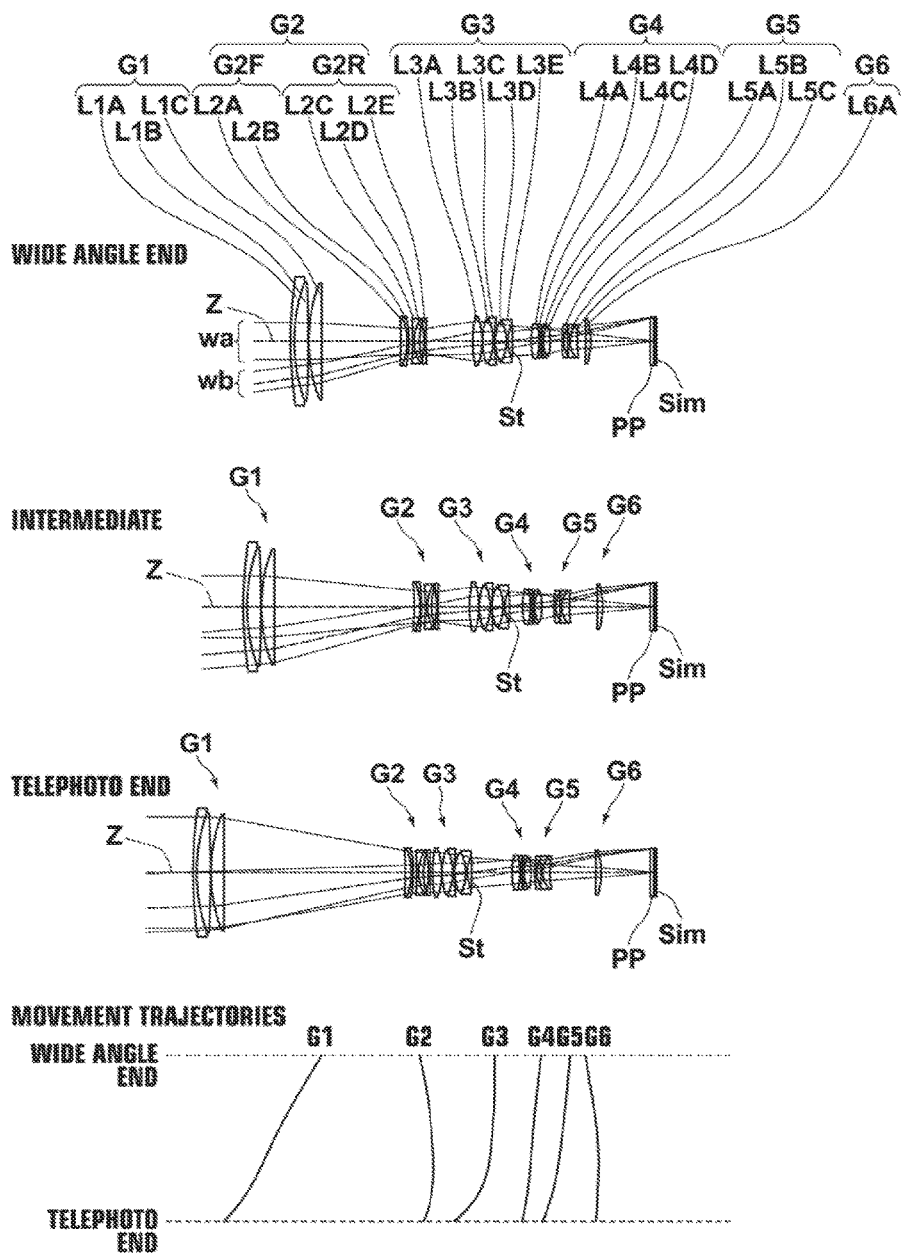
FIG. 1 is a collection of sectional diagrams that illustrate a first example of the configuration of a zoom lens according to an embodiment of the present disclosure (which is common with Example 1).

Hereinafter, embodiments of the present disclosure will be described in detail with reference to the attached drawings. FIG. 1 is a collection of sectional diagrams that illustrate the configuration of a zoom lens according to an embodiment of the present disclosure. The example of the configuration illustrated in FIG. 1 is the same as the configuration of a zoom lens of Example 1 to be described later. In FIG. 1, the left side is the object side and the right side is the image side. The aperture stop St illustrated in FIG. 1 does not necessarily represent the size or shape thereof, but the position of the aperture stop St along an optical axis Z. In addition, FIG. 1 illustrates an axial light beam wa and a light beam wb at a maximum angle of view.

As illustrated in FIG. 1, the zoom lens of the first embodiment is constituted by, in order from the object side to the image side: a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power.

When this zoom lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIG. 1 illustrates an example in which a plane parallel plate shaped optical member PP that presumes the presence of such components is provided between the lens system and the imaging surface Sim.

This zoom lens is configured such that the first lens group G1 constantly moves toward the object side, the distance between the first lens group G1 and the second lens group G2 constantly increases, the distance between the second lens group G2 and the third lens group G3 constantly decreases, the distance between the third lens group G3 and the fourth lens group G4 constantly changes, the distance between the fourth lens group G4 and the fifth lens G5 group constantly changes, and the distance between the fifth lens group G5 and the sixth lens group G6 constantly changes, when changing magnification from the wide angle end to the telephoto end. Note that all of the lens groups from among the first lens group G1 through the sixth lens group G6 may move, or only a portion of the lens groups may move, when changing magnification.

Adopting such a configuration is advantageous from the viewpoint of shortening the total length of the lens system. The advantageous effects of securing telecentric properties and shortening the total length of the lens system become particularly prominent in the case that the zoom lens is applied to a non reflex (so called mirrorless) type camera, in which back focus is short.

The first lens group G1 is constituted by, in order from the object side to the image side, a negative 1A lens L1A, a positive 1B lens L1B, and a positive 1C lens L1C. Adopting such a configuration is advantageous from the viewpoint of shortening the total length of the lens system. In addition, the negative 1A lens L1A bears the function of correcting longitudinal chromatic aberration, lateral chromatic aberration, and spherical aberration. In addition, providing the two positive lenses, which are the positive 1B lens L1B and the positive 1C lens L1C, enables the generation of spherical aberration to be suppressed while securing the positive refractive power of the first lens group G1 and shortening the total length of the lens system.

The second lens group G2 has a 2R lens group G2R having a negative refractive power as a whole and consisting of a cemented lens formed by cementing a negative lens and a positive lens, which are provided in this order from the object side to the image side, together, and a negative single lens. The second lens group G2 principally bears the function of changing magnification. Here, the cemented lens bears the function of suppressing fluctuations in longitudinal chromatic aberration and lateral chromatic aberration when changing magnification. In addition, the negative single lens distributes negative refractive power with the negative lens within the cemented lens, and bears the function of suppressing the generation of spherical aberration, astigmatism, and distortion.

The third lens group G3 bears the principal positive refractive effect of the entire lens system.

The fourth lens group G4 distributes positive refractive power with the third lens group G3, and bears the function of suppressing the generation of spherical aberration and fluctuations in spherical aberration while changing magnification.

The fifth lens group G5 is constituted by, in order from the object side to the image side, a negative 5A lens L5A, a negative 5B lens L5B, and a positive 5C lens L5C. By adopting this configuration, fluctuations in astigmatism while changing magnification can be corrected. Here, by positioning the two negative lenses, which are the negative 5A lens L5A and the negative 5B lens L5B, toward the object side, the generation of various aberrations can be decreased, while suppressing fluctuations in astigmatism while changing magnification. In addition, the positive 5C lens bears the function of correcting fluctuations in lateral chromatic aberration while changing magnification, by being combined with the negative 5A lens L5A and the negative 5B lens L5B.

The sixth lens group G6 bears the function of decreasing the incident angles of light rays at peripheral angles of view that enter an image formation plane Sim.

It is preferable for Conditional Formula (1) below to be satisfied in the zoom lens of the present embodiment. Configuring the zoom lens such that the value of f2/f1 is not less than or equal to the lower limit defined in Conditional Formula (1) is advantageous from the viewpoint of shortening the total length of the lens system at the telephoto end. In addition, configuring the zoom lens such that the value of f2/f1 is not greater than or equal to the upper limit defined in Conditional Formula (1) is advantageous from the viewpoints of correcting longitudinal chromatic aberration and miniaturizing the first lens group G1. Note that more favorable properties can be obtained in the case that Conditional Formula (1-1) below is satisfied.

$$-0.3 < f2/f1 < -0.1 \tag{1}$$

$$-0.25 < f2/f1 < -0.15 \tag{1-1}$$

wherein f2 is the paraxial focal length with respect to the d line of the second lens group, and f1 is the paraxial focal length with respect to the d line of the first lens group.

In addition, it is preferable for Conditional Formula (2) below to be satisfied. Configuring the zoom lens such that the value of f2/f3 is not less than or equal to the lower limit defined in Conditional Formula (2) is advantageous from the viewpoints of suppressing spherical aberration and suppressing fluctuations in longitudinal chromatic aberration. In addition, configuring the zoom lens such that the value of f2/f3 is not greater than or equal to the upper limit defined in Conditional Formula (2) is advantageous from the viewpoint of maintaining the diameters of the lenses of the second lens group G2, the third lens group G3, and the lens groups positioned toward the image side of the third lens group G3 small. Note that more favorable properties can be obtained in the case that Conditional Formula (2-1) below is satisfied.

$$-0.9 < f2/f3 < -0.6 \tag{2}$$

$$-0.8 < f2/f3 < -0.7 \tag{2-1}$$

wherein f2 is the paraxial focal length with respect to the d line of the second lens group, and f3 is the paraxial focal length with respect to the d line of the third lens group.

In addition, it is preferable for the second lens group G2 to have a 2F lens group G2F that includes a cemented lens formed by cementing a positive lens and a negative lens, provided in this order from the object side to the image side, together, adjacent to the 2R lens group 2GR at the object side thereof. Adopting such a configuration is advantageous from the viewpoints of correcting fluctuations in longitudinal chromatic aberration while changing magnification, suppressing longitudinal chromatic aberration at the telephoto end, aiding the correction of longitudinal chromatic aberration by the first lens group G1, and shortening the total length of the lens system.

In addition, it is preferable for Conditional Formula (3) below to be satisfied. Configuring the zoom lens such that the value of f2/f2R is not less than or equal to the lower limit defined in Conditional Formula (3) is advantageous from the viewpoint of securing the magnification changing effect of the second lens group G2. In addition, configuring the zoom lens such that the value of f2/f2R is not greater than or equal to the upper limit defined in Conditional Formula (3) is advantageous from the viewpoint of suppressing spherical aberration, astigmatism, and distortion. Note that more favorable properties can be obtained in the case that Conditional Formula (3-1) below is satisfied.

$$0.8<f2/f2R<1.4 \quad (3)$$

$$1<f2/f2R<1.25 \quad (3\text{-}1)$$

wherein f2 is the paraxial focal length with respect to the d line of the second lens group, and f2R is the paraxial focal length with respect to the d line of the 2R lens group.

In addition, it is preferable for the 2R lens group G2R to be moved in a direction perpendicular to the optical axis in order to correct for camera shake. Correcting for camera shake at this position is optimal for securing sensitivity of the camera shake correcting lenses, and can decrease the amount of movement necessary to correct for camera shake. Therefore, fluctuations in aberrations while correcting for camera shake will be small, and enlargement of the lens in the radial direction can be suppressed.

In addition, it is preferable for the fifth lens group G5 to move toward the image side when changing focus from that on an object at infinity to that on an object at a most proximal distance. By performing focusing operations at this position, fluctuations in aberrations during focusing operations can be kept small. In addition, because the fifth lens group G5 is positioned at the image side of the third lens group G3 and the fourth lens group G4, which have positive refractive powers, the size thereof in the radial direction can be decreased, which facilitates weight reduction of the fifth lens group G5. Such a configuration is advantageous from the viewpoint of performing high speed focusing operations.

In addition, it is preferable for Conditional Formula (4) below to be satisfied. Configuring the zoom lens such that the value of f5/f1 is not less than or equal to the lower limit defined in Conditional Formula (4) enables the amount of movement of the fifth lens group G5 to be decreased, which is advantageous from the viewpoint of shortening the total length of the lens system. In addition, configuring the zoom lens such that the value of f5/f1 is not greater than or equal to the upper limit defined in Conditional Formula (4) is advantageous from the viewpoint of suppressing fluctuations in astigmatism. Note that more favorable properties can be obtained in the case that Conditional Formula (4-1) below is satisfied.

$$-0.25<f5/f1<-0.05 \quad (4)$$

$$-0.2<f5/f1<-0.1 \quad (4\text{-}1)$$

wherein f5 is the paraxial focal length with respect to the d line of the fifth lens group, and f1 is the paraxial focal length with respect to the d line of the first lens group.

In addition, it is preferable for Conditional Formula (5) below to be satisfied. Configuring the zoom lens such that the value of f5A/f5 is not less than or equal to the lower limit defined in Conditional Formula (5) is advantageous from the viewpoint of suppressing the generation of spherical aberration. In addition, configuring the zoom lens such that the value of f5A/f5 is not greater than or equal to the upper limit defined in Conditional Formula (5) is advantageous from the viewpoints of suppressing astigmatism. Note that more favorable properties can be obtained in the case that Conditional Formula (5-1) below is satisfied.

$$0.8<f5A/f5<1.3 \quad (5)$$

$$0.9<f5A/f5<1.2 \quad (5\text{-}1)$$

wherein f5A is the paraxial focal length with respect to the d line of the negative 5A lens, and f5 is the paraxial focal length with respect to the d line of the fifth lens group.

In addition, it is preferable for Conditional Formula (6) below to be satisfied. Configuring the zoom lens such that the value of (vd5A+vd5B)/2 is not less than or equal to the lower limit defined in Conditional Formula (6) is advantageous from the viewpoints of correcting lateral chromatic aberration and suppressing fluctuations in lateral chromatic aberration while changing magnification. In addition, there is a tendency for the refractive index to decrease as the Abbe's number increases. Therefore, it is necessary to secure refractive power by decreasing the curvatures of lenses. For this reason, configuring the zoom lens such that the value of (vd5A+vd5B)/2 is not greater than or equal to the upper limit defined in Conditional Formula (6) is advantageous from the viewpoint of preventing the lenses from becoming excessively large. Note that more favorable properties can be obtained in the case that Conditional Formula (6-1) below is satisfied.

$$45<(vd5A+vd5B)/2<80 \quad (6)$$

$$50<(vd5A+vd5B)/2<75 \quad (6\text{-}1)$$

wherein vd5A is the Abbe's number with respect to the d line of the negative 5A lens, and vd5B is the Abbe's number with respect to the d line of the negative 5B lens.

In addition, it is preferable for the third lens group to have, in order from the object side to the image side, a positive single lens, a 3A cemented lens (the cemented constituted by a lens L3B and a lens L3C in FIG. 1), in which a positive lens and a negative lens provided in this order from the object side to the image side are cemented together, and a 3B cemented lens (the cemented constituted by a lens L3D and a lens L3E in FIG. 1), in which a positive lens and a negative lens provided in this order from the object side to the image side are cemented together. Adopting such a configuration is advantageous from the viewpoints of reducing the diameters of the lenses and correcting vertical chromatic aberration. Here, the positive single lens exhibits the effect of decreasing the diameters of the lenses included in the third lens group G3 and the lens groups positioned at the image side of the third lens group G3. In addition, the two cemented lenses exhibit the advantageous effects of correcting longitudinal chromatic aberration and color bleeding caused by color shifts of spherical aberration.

In addition, it is preferable for an aperture stop St to be positioned adjacent to the third lens group G3 toward the image side thereof, and for the aperture stop St to move integrally with the third lens group G3 when changing magnification. Positioning the aperture stop St at the image side of the third lens group G3 in this manner is advantageous from the viewpoint of miniaturizing a stop unit.

In addition, it is preferable for the sixth lens group G6 to consist of a positive 6A lens L6A. If the number of lenses within the sixth lens group G6 increases and the thickness thereof increases, it will become necessary to increase the negative refractive power of the second lens group G2 or the fifth lens group G5. This will result in an increase in fluctuations of spherical aberration. Therefore, constituting the sixth lens group G6 by a single lens in this manner is advantageous from the viewpoint of suppressing fluctuations in spherical aberration.

In the case that the present zoom lens is to be utilized in an environment in which the zoom lens is likely to be damaged, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the zoom lens of the present disclosure will be described.

First, the zoom lens of Example 1 will be described. FIG. 1 is a collection of sectional diagrams that illustrate the lens configuration of the zoom lens of Example 1. Note that in FIG. 1 and FIGS. 2 through 8 that correspond to Examples 2 through 8 to be described later, the left side is the object side, the right side is the image side, and the aperture stops St in the drawings do not necessarily represent the size or the shape thereof, but the position thereof along the optical axis Z.

In the zoom lens of Example 1, the first lens group G1 is constituted by three lenses, which are lenses L1A through L1C, the second lens group G2 is constituted by five lenses, which are lenses L2A through L2E, the third lens group G3 is constituted by five lenses, which are lenses L3A through L3E, the fourth lens group G4 is constituted by four lenses, which are lenses L4A through L4D, the fifth lens group G5 is constituted by three lenses, which are lenses L5A through L5C, and the sixth lens group G6 is constituted by one lens, which is a lens L6A. The second lens group G2 is constituted by, in order from the object side to the image side, a 2F lens group G2F and a 2R lens group G2R. The 2F lens group G2F is constituted by a cemented lens, formed by cementing a positive lens L2A and a negative lens L2B, provided in this order from the object side to the image side, together. The 2R lens group G2R is constituted by, in order from the object side to the image side, a cemented lens, formed by cementing a negative lens L2C and a positive lens L2D together, and a negative single lens L2E.

Basic lens data are shown in Table 1, data related to various items are shown in Table 2, and data related to the distances among movable surfaces are shown in Table 3, for the zoom lens of Example 1. In the following description, the meanings of the symbols in the tables will be described for Example 1. The meanings of the symbols are basically the same for Examples 2 and 8.

In the lens data of Table 1, surface numbers that sequentially increase from the object side to the image side, with the surface of the constituent element at the most object side designated as first, are shown in the column "Surface Number". The radii of curvature of ith surfaces are shown in the column of "Radius of Curvature", the distances along the optical axis Z between each surface and a next surface are shown in the column "Distance". The refractive indices of each optical element with respect to the d line (wavelength: 587.6 nm) are shown in the column nd. The Abbe's numbers of each optical element with respect to the d line (wavelength: 587.6 nm) are shown in the column vd. The partial dispersion ratio of each optical element is shown in the column "θgF".

Note that the partial dispersion ratio θgF is represented by the formula below.

$$\theta gF = (ng - nF)/(nF - nC)$$

wherein ng is the refractive index with respect to the g line, nF is the refractive index with respect to the F line, and nC is the refractive index with respect to the C line.

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop. In addition, DD [surface number] is indicated in the column "Distance" for distances that change while changing magnification. The numerical values corresponding to DD [surface number] are shown in Table 3.

Table 2 shows the values of the zoom magnification rates of the entire system, the focal lengths "f", the F numbers "F No.", and the full angles of view "2ω" at the wide angle end, at an intermediate position, and at the telephoto end, respectively, as the data related to various items.

In the basic lens data, the data related to various items, and the data related to the distances among movable surfaces, mm are used as the units for lengths and degrees are used as the units for angles. However, it is possible for optical systems to be proportionately enlarged or proportionately reduced and utilized. Therefore, other appropriate units may be used.

TABLE 1

Example 1: Lens Data

| Surface Number | Radius of Curvature | Distance | nd | vd | θgF |
|---|---|---|---|---|---|
| 1 | 269.48203 | 2.220 | 1.83481 | 42.72 | 0.56486 |
| 2 | 107.65000 | 8.450 | 1.49700 | 81.54 | 0.53748 |
| 3 | −666.67333 | 0.150 | | | |
| 4 | 96.62397 | 7.950 | 1.43875 | 94.66 | 0.53402 |
| 5 | ∞ | DD [5] | | | |
| 6 | −208.69230 | 3.690 | 1.60562 | 43.71 | 0.57214 |
| 7 | −38.62300 | 1.000 | 1.75500 | 52.32 | 0.54765 |
| 8 | −78.91650 | 2.300 | | | |
| 9 | −167.21335 | 1.010 | 1.59522 | 67.73 | 0.54426 |
| 10 | 25.00500 | 3.090 | 1.78470 | 26.29 | 0.61360 |
| 11 | 44.82826 | 2.870 | | | |
| 12 | −69.05525 | 1.000 | 1.81600 | 46.62 | 0.55682 |
| 13 | 193.37055 | DD [13] | | | |
| 14 | 71.43178 | 5.720 | 1.58913 | 61.13 | 0.54067 |
| 15 | −44.45211 | 0.150 | | | |
| 16 | 39.58695 | 6.530 | 1.49700 | 81.54 | 0.53748 |
| 17 | −33.11400 | 1.000 | 1.90043 | 37.37 | 0.57720 |
| 18 | 139.34617 | 0.180 | | | |
| 19 | 28.83700 | 6.700 | 1.58267 | 46.42 | 0.56716 |
| 20 | −28.83700 | 1.000 | 1.51742 | 52.43 | 0.55649 |

TABLE 1-continued

Example 1: Lens Data

| Surface Number | Radius of Curvature | Distance | nd | νd | θgF |
|---|---|---|---|---|---|
| 21 | 21.27628 | 2.780 | | | |
| 22 (stop) | ∞ | DD [22] | | | |
| 23 | 49.78064 | 4.670 | 1.49700 | 81.54 | 0.53748 |
| 24 | −56.44194 | 0.330 | | | |
| 25 | −40.48697 | 1.000 | 1.83481 | 42.72 | 0.56486 |
| 26 | −448.89591 | 0.170 | | | |
| 27 | 40.52272 | 1.010 | 1.69700 | 48.52 | 0.55889 |
| 28 | 20.75000 | 4.300 | 1.51742 | 52.43 | 0.55649 |
| 29 | −43.73001 | DD [29] | | | |
| 30 | 92.44720 | 1.000 | 1.61800 | 63.33 | 0.54414 |
| 31 | 16.39421 | 2.630 | | | |
| 32 | ∞ | 1.010 | 1.49700 | 81.54 | 0.53748 |
| 33 | 14.90900 | 4.450 | 1.69350 | 53.20 | 0.54731 |
| 34 | 53.22030 | DD [34] | | | |
| 35 | −249.66626 | 2.910 | 1.54072 | 47.23 | 0.56511 |
| 36 | −49.77001 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 2

Example 1: Items (d line)

| | Wide Angle | Intermediate | Telephoto |
|---|---|---|---|
| Zoom Ratio | 1.0 | 1.7 | 3.8 |
| f | 102.873 | 178.159 | 387.872 |
| FNo. | 4.62 | 4.79 | 5.78 |
| 2ω (°) | 15.6 | 9.0 | 4.2 |

TABLE 3

Example 1: Distances Among Movable Surfaces

| | Wide Angle | Intermediate | Telephoto |
|---|---|---|---|
| DD [5] | 47.912 | 84.375 | 109.566 |
| DD [13] | 28.893 | 19.144 | 1.765 |
| DD [22] | 11.359 | 7.991 | 24.280 |
| DD [29] | 7.202 | 7.574 | 2.343 |
| DD [34] | 5.165 | 17.208 | 27.898 |
| DD [36] | 36.048 | 28.853 | 29.788 |

Figure 9:
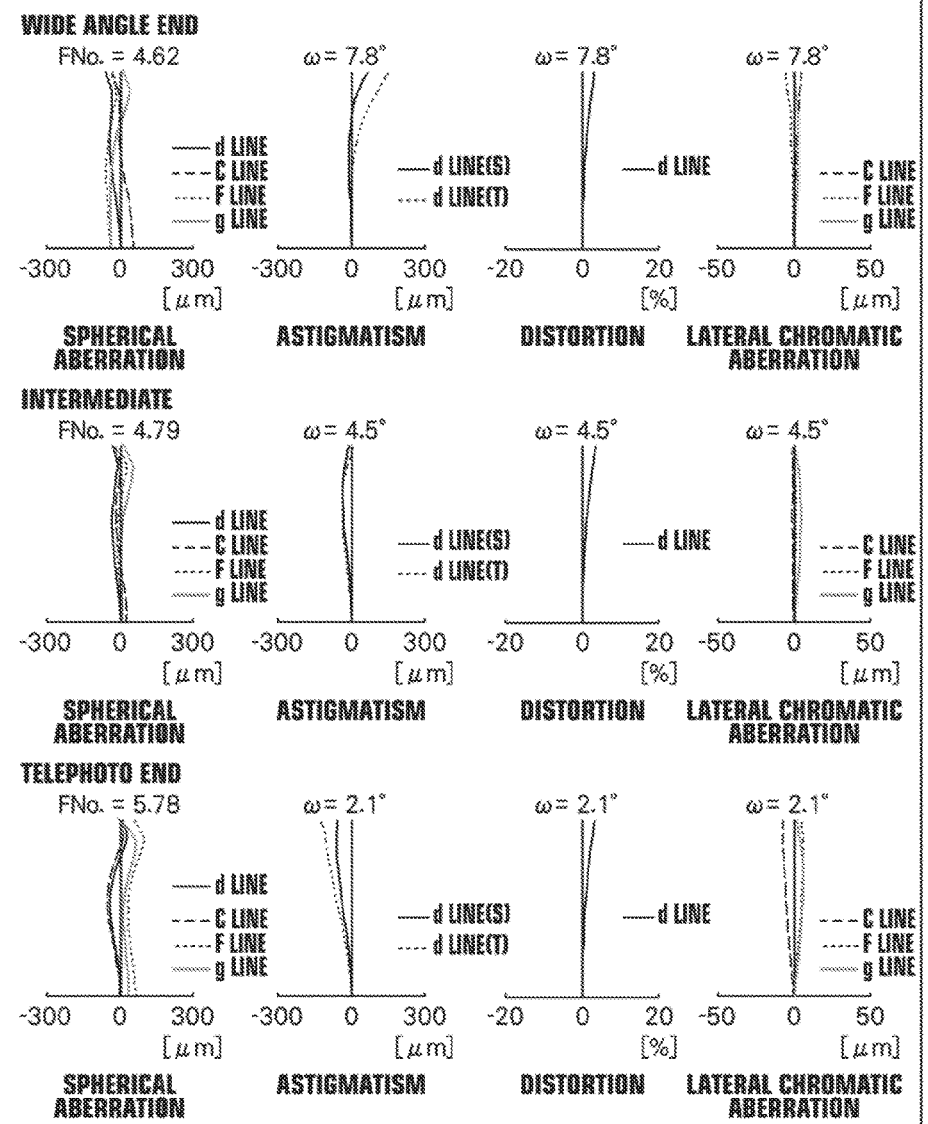
FIG. 9 is a collection of diagrams that illustrate aberrations of the zoom lens of Example 1.

FIG. 9 is a collection of diagrams that illustrate various aberrations of the zoom lens of Example 1. The spherical aberration, the astigmatism, the distortion, and the lateral chromatic aberration of the zoom lens of Example 1 at the wide angle end are illustrated in this order from the left side of the drawing sheet at the upper portion of FIG. 5. The spherical aberration, the astigmatism, the distortion, and the lateral chromatic aberration of the zoom lens of Example 1 at an intermediate focal distance are illustrated are illustrated in this order from the left side of the drawing sheet at the middle portion of FIG. 5. The spherical aberration, the astigmatism, the distortion, and the lateral chromatic aberration of the zoom lens of Example 1 at the telephoto end are illustrated in are illustrated in this order from the left side of the drawing sheet at the lower portion of FIG. 5. Each of the aberration diagrams show aberrations using the d line (wavelength: 587.6 nm) as a reference wavelength. The diagrams that illustrate spherical aberration show aberrations related to the d line (wavelength: 587.6 nm), aberrations related to the C line (wavelength: 656.3 nm), aberrations related to the F line (wavelength: 486.1 nm), and aberrations related to the g line (wavelength: 435.8 nm) as solid lines, long broken lines, short broken lines, and solid gray lines, respectively. In the diagrams that illustrate astigmatism, aberrations in the sagittal direction and aberrations in the tangential direction are indicated by solid lines and short broken lines, respectively. In the diagrams that illustrate lateral chromatic aberration, aberrations related to the C line (wavelength: 656.3 nm), aberrations related to the F line (wavelength: 486.1 nm), and aberrations related to the g line (wavelength: 435.8 nm) are shown as long broken lines, short broken lines, and solid gray lines, respectively. Note that these vertical aberrations are all for a state focused on an object at infinity. In the diagrams that illustrate spherical aberrations, "F No." denotes F values. In the other aberration diagrams, "ω" denotes half angles of view.

The symbols, the meanings, and the manner in which the data are shown in the description of Example 1 above are the same for the following Examples to be described later, unless particularly noted. Therefore, redundant descriptions thereof will be omitted below.

Figure 2:
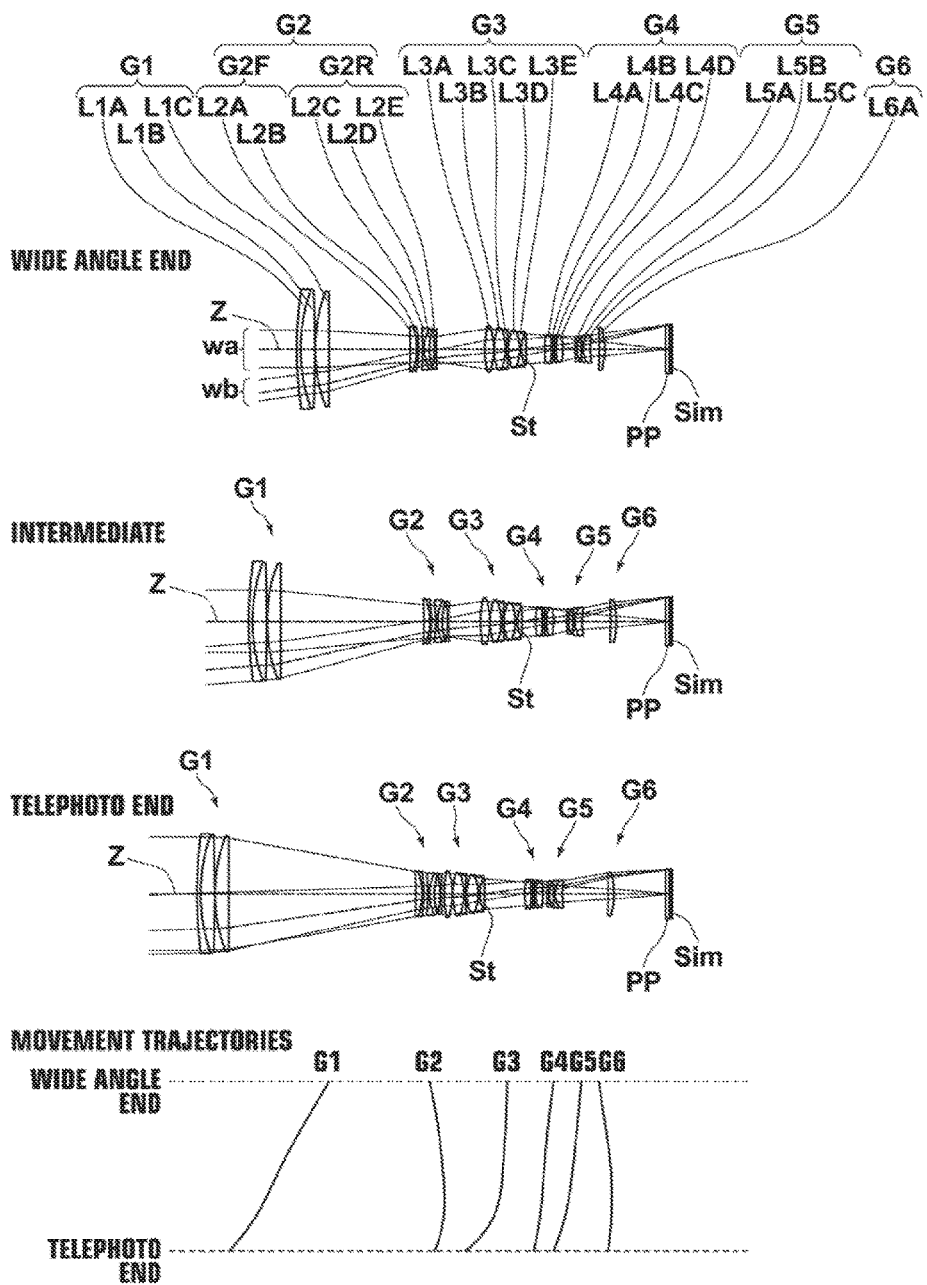
FIG. 2 is a collection of sectional diagrams that illustrate the configuration of a zoom lens according to Example 2.
Figure 10:
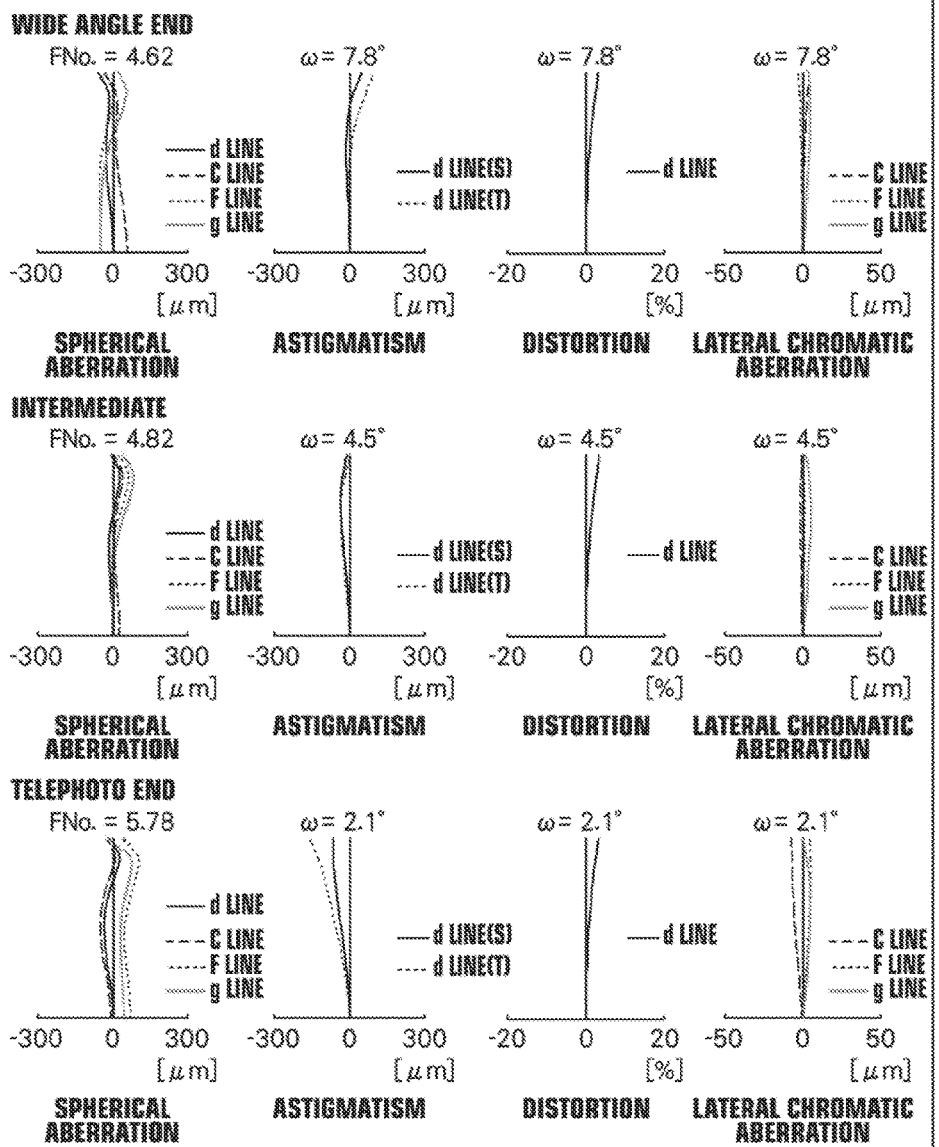
FIG. 10 is a collection of diagrams that illustrate aberrations of the zoom lens of Example 2.

Next, a zoom lens according to Example 2 will be described. FIG. 2 is a collection of sectional diagrams that illustrate the lens configuration of the zoom lens of Example 2. The number of lenses in each lens group within the zoom lens of Example 2 is the same as those for Example 1. Basic lens data are shown in Table 4, data related to various items are shown in Table 5, data related to the distances among movable surfaces are shown in Table 6, and various aberrations are illustrated in FIG. 10 for the zoom lens of Example 2.

TABLE 4

Example 2: Lens Data

| Surface Number | Radius of Curvature | Distance | nd | νd | θgF |
|---|---|---|---|---|---|
| 1 | 258.99426 | 2.220 | 1.83481 | 42.72 | 0.56486 |
| 2 | 105.99457 | 8.370 | 1.49700 | 81.54 | 0.53748 |
| 3 | −813.40013 | 0.150 | | | |
| 4 | 96.96234 | 8.250 | 1.43875 | 94.66 | 0.53402 |
| 5 | −12541.90626 | DD [5] | | | |
| 6 | −228.16128 | 3.720 | 1.60562 | 43.71 | 0.57214 |
| 7 | −38.90795 | 1.000 | 1.75500 | 52.32 | 0.54765 |
| 8 | −80.70102 | 2.300 | | | |
| 9 | −168.51961 | 1.010 | 1.59522 | 67.73 | 0.54426 |
| 10 | 24.91505 | 3.114 | 1.78470 | 26.29 | 0.61360 |
| 11 | 44.46548 | 2.958 | | | |
| 12 | −68.97092 | 1.000 | 1.81600 | 46.62 | 0.55682 |
| 13 | 198.22555 | DD [13] | | | |
| 14 | 70.13675 | 5.340 | 1.58913 | 61.13 | 0.54067 |
| 15 | −44.50451 | 0.150 | | | |
| 16 | 38.68170 | 6.653 | 1.49700 | 81.54 | 0.53748 |
| 17 | −33.05588 | 1.000 | 1.90043 | 37.37 | 0.57720 |
| 18 | 138.23933 | 0.668 | | | |
| 19 | 29.56207 | 6.760 | 1.58267 | 46.42 | 0.56716 |
| 20 | −27.52545 | 1.000 | 1.51742 | 52.43 | 0.55649 |
| 21 | 21.28674 | 2.738 | | | |
| 22 (stop) | ∞ | DD [22] | | | |
| 23 | 51.18087 | 3.962 | 1.49700 | 81.54 | 0.53748 |
| 24 | −58.76135 | 0.287 | | | |
| 25 | −41.01946 | 1.000 | 1.83481 | 42.72 | 0.56486 |
| 26 | −442.07391 | 0.150 | | | |
| 27 | 40.21747 | 1.010 | 1.69700 | 48.52 | 0.55889 |
| 28 | 20.72664 | 4.266 | 1.51742 | 52.43 | 0.55649 |
| 29 | −43.41757 | DD [29] | | | |
| 30 | 117.47452 | 1.000 | 1.61800 | 63.33 | 0.54414 |
| 31 | 16.99748 | 2.597 | | | |
| 32 | 274.37374 | 1.010 | 1.49700 | 81.54 | 0.53748 |
| 33 | 15.00523 | 4.204 | 1.69350 | 53.20 | 0.54731 |
| 34 | 46.29321 | DD [34] | | | |
| 35 | −252.89772 | 3.324 | 1.54072 | 47.23 | 0.56511 |
| 36 | −48.70676 | DD [36] | | | |

TABLE 4-continued

Example 2: Lens Data

| Surface Number | Radius of Curvature | Distance | nd | vd | θgF |
|---|---|---|---|---|---|
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 5

Example 2: Items (d line)

| | Wide Angle | Intermediate | Telephoto |
|---|---|---|---|
| Zoom Ratio | 1.0 | 1.7 | 3.8 |
| f | 102.898 | 178.202 | 387.966 |
| FNo. | 4.62 | 4.82 | 5.78 |
| 2ω (°) | 15.6 | 9.0 | 4.2 |

TABLE 6

Example 2: Distances Among Movable Surfaces

| | Wide Angle | Intermediate | Telephoto |
|---|---|---|---|
| DD [5] | 47.985 | 84.100 | 110.054 |
| DD [13] | 29.209 | 19.050 | 1.658 |
| DD [22] | 11.087 | 7.995 | 23.693 |
| DD [29] | 7.254 | 7.894 | 2.707 |
| DD [34] | 5.281 | 16.955 | 27.046 |
| DD [36] | 35.935 | 29.107 | 30.587 |

Figure 3:
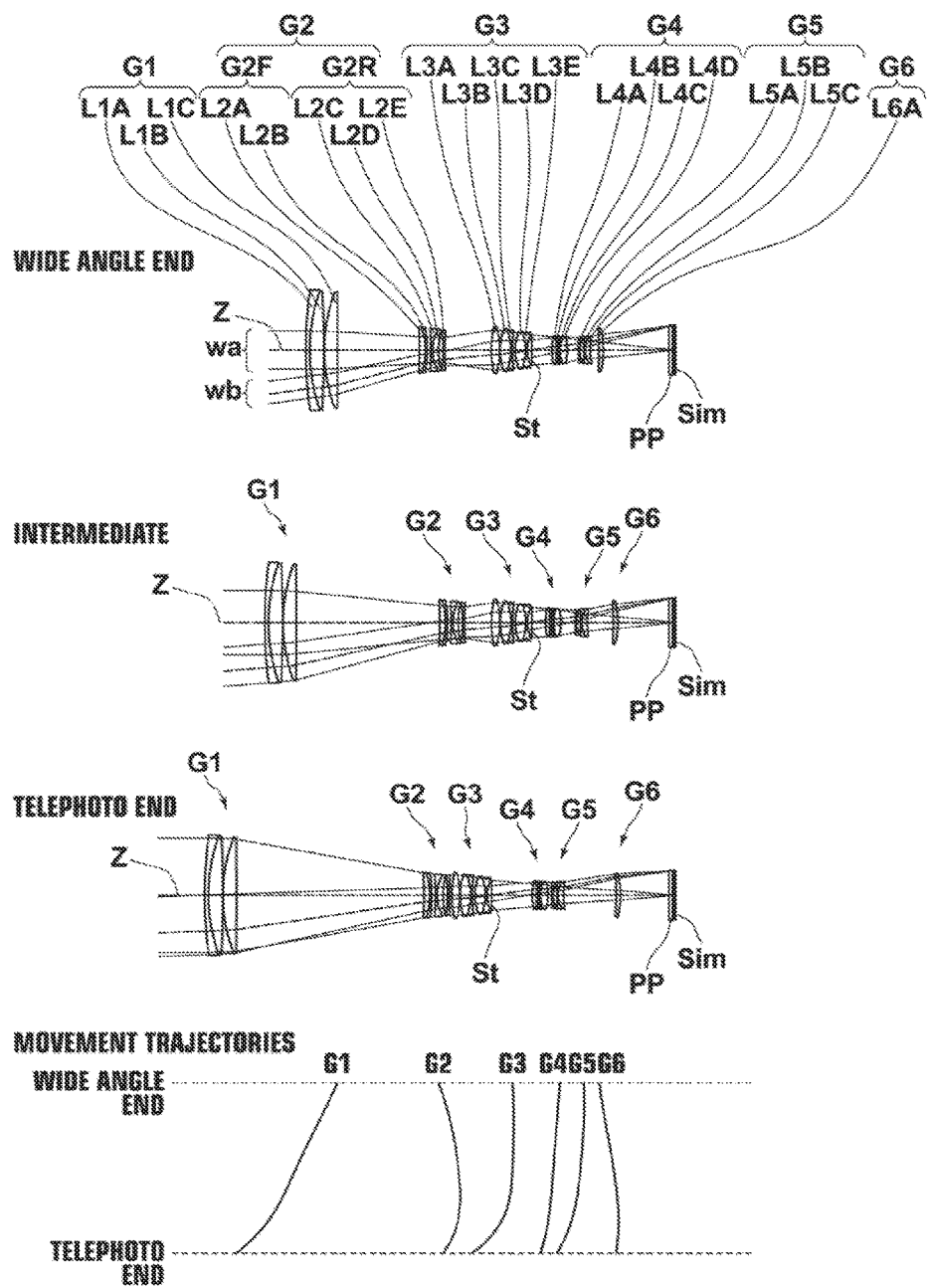
FIG. 3 is a collection of sectional diagrams that illustrate the configuration of a zoom lens according to Example 3.
Figure 11:
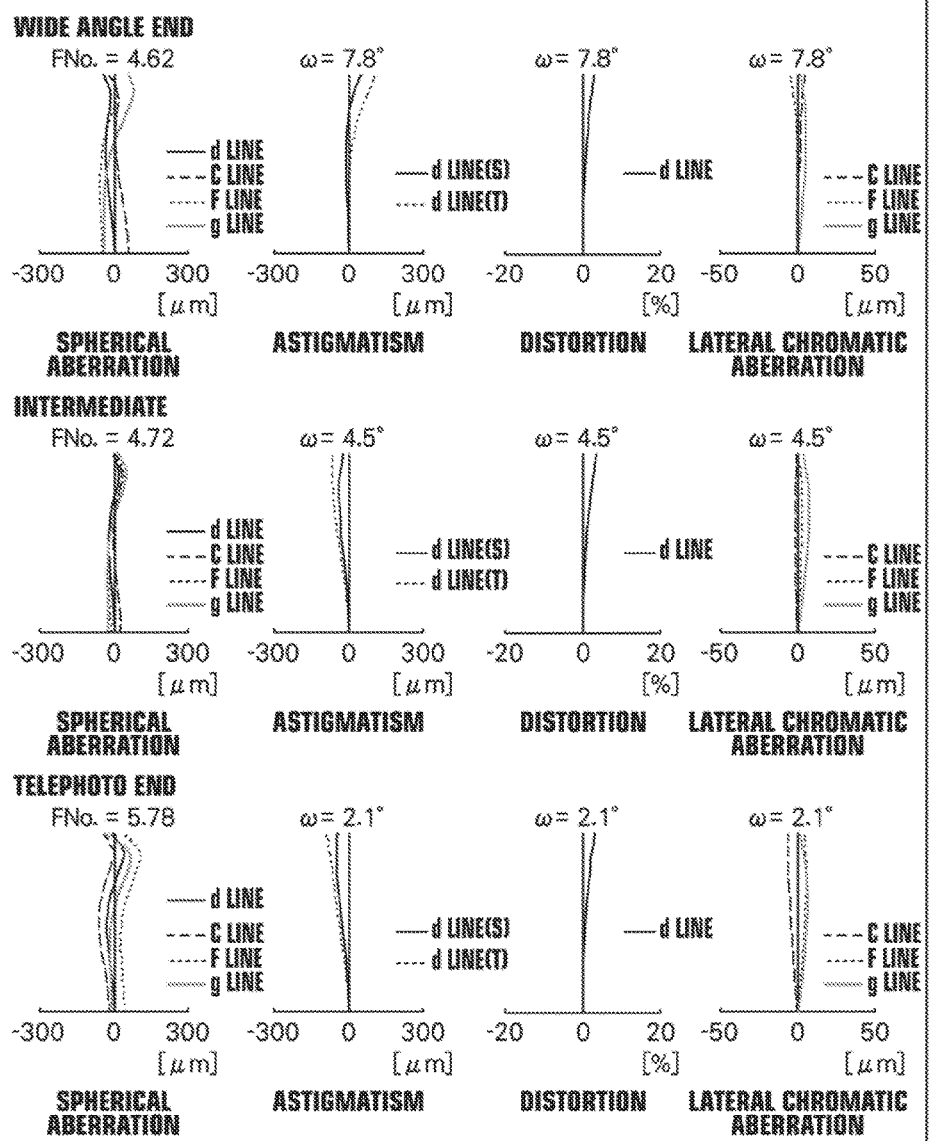
FIG. 11 is a collection of diagrams that illustrate aberrations of the zoom lens of Example 3.

Next, a zoom lens according to Example 3 will be described. FIG. 3 is a collection of sectional diagrams that illustrate the lens configuration of the zoom lens of Example 3. The number of lenses in each lens group within the zoom lens of Example 3 is the same as those for Example 1. Basic lens data are shown in Table 7, data related to various items are shown in Table 8, data related to the distances among movable surfaces are shown in Table 9, and various aberrations are illustrated in FIG. 11 for the zoom lens of Example 3.

TABLE 7

Example 3: Lens Data

| Surface Number | Radius of Curvature | Distance | nd | vd | θgF |
|---|---|---|---|---|---|
| 1 | 262.40932 | 2.220 | 1.83481 | 42.72 | 0.56486 |
| 2 | 105.54031 | 8.384 | 1.49700 | 81.54 | 0.53748 |
| 3 | −733.03668 | 0.150 | | | |
| 4 | 95.96727 | 7.808 | 1.43387 | 95.18 | 0.53733 |
| 5 | −15644.45936 | DD [5] | | | |
| 6 | −228.28533 | 3.522 | 1.58267 | 46.42 | 0.56716 |
| 7 | −38.72547 | 0.900 | 1.69680 | 55.53 | 0.54341 |
| 8 | −85.18699 | 2.301 | | | |
| 9 | −172.24235 | 0.910 | 1.59522 | 67.73 | 0.54426 |
| 10 | 23.88538 | 3.576 | 1.78470 | 26.29 | 0.61360 |
| 11 | 46.63101 | 2.720 | | | |
| 12 | −78.62778 | 0.900 | 1.83481 | 42.72 | 0.56486 |
| 13 | 120.57303 | DD [13] | | | |
| 14 | 62.51644 | 5.042 | 1.60311 | 60.64 | 0.54148 |
| 15 | −44.95879 | 0.150 | | | |
| 16 | 37.70765 | 6.383 | 1.49700 | 81.54 | 0.53748 |
| 17 | −32.17618 | 0.800 | 1.90043 | 37.37 | 0.57720 |
| 18 | 122.86192 | 1.690 | | | |
| 19 | 28.87948 | 6.260 | 1.58267 | 46.42 | 0.56716 |
| 20 | −26.63471 | 0.800 | 1.51742 | 52.43 | 0.55649 |
| 21 | 20.72606 | 2.745 | | | |

TABLE 7-continued

Example 3: Lens Data

| Surface Number | Radius of Curvature | Distance | nd | vd | θgF |
|---|---|---|---|---|---|
| 22 (stop) | ∞ | DD [22] | | | |
| 23 | 50.07194 | 2.519 | 1.49700 | 81.54 | 0.53748 |
| 24 | −74.92532 | 0.437 | | | |
| 25 | −40.58758 | 0.700 | 1.72000 | 41.98 | 0.57299 |
| 26 | −885.62981 | 0.174 | | | |
| 27 | 38.59955 | 0.710 | 1.72000 | 43.69 | 0.56995 |
| 28 | 20.36324 | 4.380 | 1.51742 | 52.43 | 0.55649 |
| 29 | −42.13900 | DD [29] | | | |
| 30 | 133.32611 | 0.700 | 1.61800 | 63.33 | 0.54414 |
| 31 | 17.23714 | 2.422 | | | |
| 32 | 207.21027 | 0.710 | 1.49700 | 81.54 | 0.53748 |
| 33 | 14.95626 | 3.161 | 1.69700 | 48.52 | 0.55889 |
| 34 | 49.34035 | DD [34] | | | |
| 35 | −251.94791 | 2.500 | 1.51742 | 52.43 | 0.55649 |
| 36 | −51.99972 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 8

Example 3: Items (d line)

| | Wide Angle | Intermediate | Telephoto |
|---|---|---|---|
| Zoom Ratio | 1.0 | 1.7 | 3.8 |
| f | 102.890 | 178.188 | 387.935 |
| FNo. | 4.62 | 4.72 | 5.78 |
| 2ω (°) | 15.6 | 9.0 | 4.2 |

TABLE 9

Example 3: Distances Among Movable Surfaces

| | Wide Angle | Intermediate | Telephoto |
|---|---|---|---|
| DD [5] | 48.275 | 84.574 | 110.603 |
| DD [13] | 28.061 | 16.145 | 1.643 |
| DD [22] | 11.932 | 7.999 | 24.129 |
| DD [29] | 6.601 | 8.569 | 2.281 |
| DD [34] | 5.219 | 15.525 | 30.943 |
| DD [36] | 38.604 | 30.180 | 28.730 |

Figure 4:
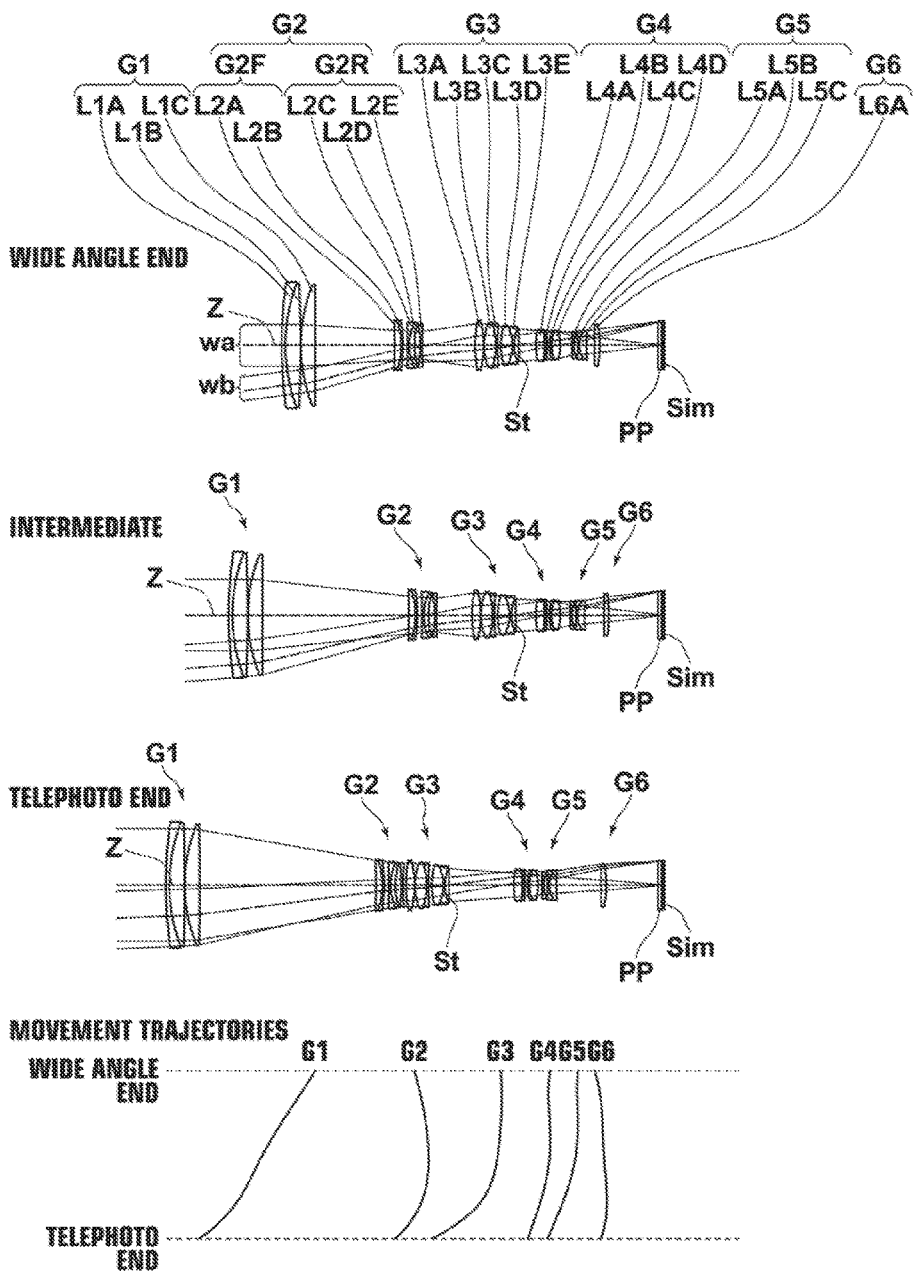
FIG. 4 is a collection of sectional diagrams that illustrate the configuration of a zoom lens according to Example 4.
Figure 12:
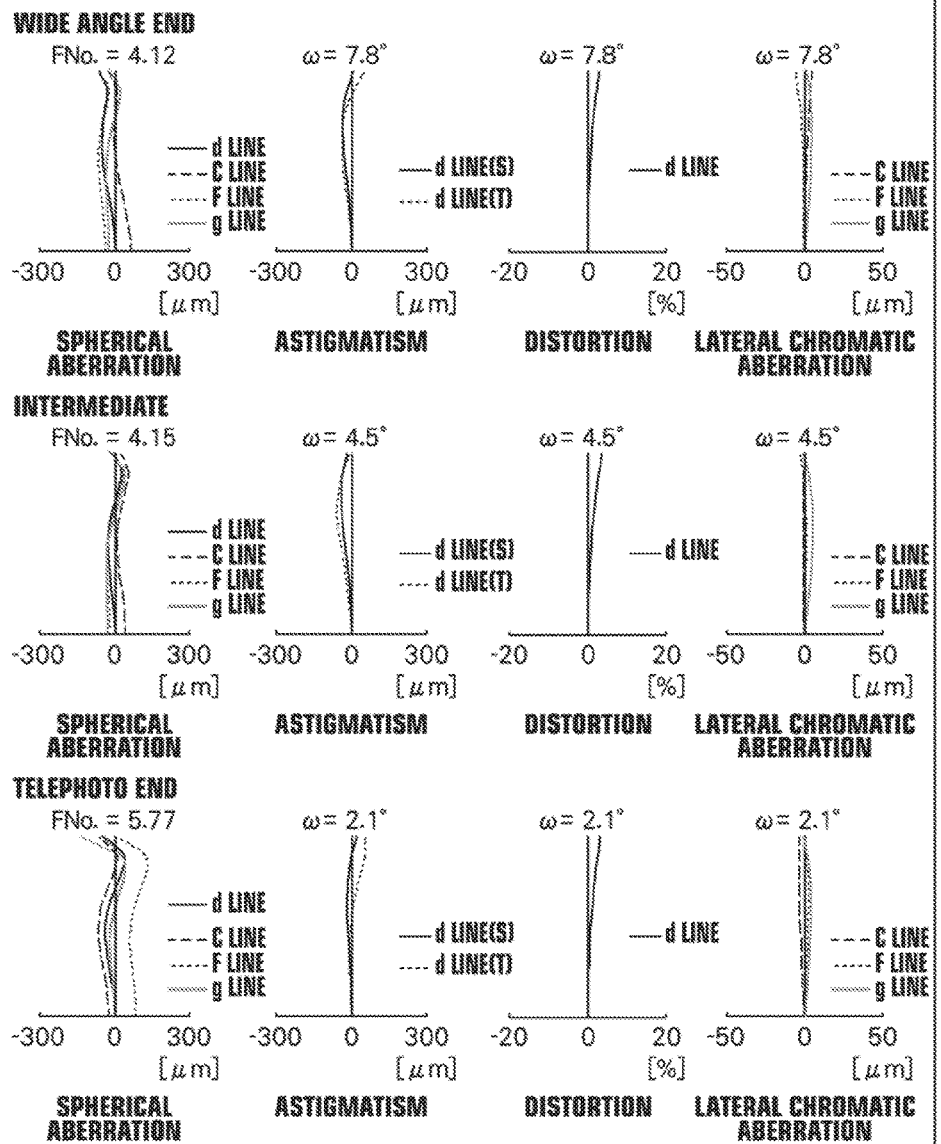
FIG. 12 is a collection of diagrams that illustrate aberrations of the zoom lens of Example 4.

Next, a zoom lens according to Example 4 will be described. FIG. 4 is a collection of sectional diagrams that illustrate the lens configuration of the zoom lens of Example 4. The number of lenses in each lens group within the zoom lens of Example 4 is the same as those for Example 1. Basic lens data are shown in Table 10, data related to various items are shown in Table 11, data related to the distances among movable surfaces are shown in Table 12, and various aberrations are illustrated in FIG. 12 for the zoom lens of Example 4.

TABLE 10

Example 4: Lens Data

| Surface Number | Radius of Curvature | Distance | nd | vd | θgF |
|---|---|---|---|---|---|
| 1 | 261.69144 | 2.220 | 1.83481 | 42.72 | 0.56486 |
| 2 | 107.03880 | 9.000 | 1.49700 | 81.54 | 0.53748 |
| 3 | −1029.68373 | 0.150 | | | |
| 4 | 97.17921 | 8.700 | 1.43875 | 94.94 | 0.53433 |
| 5 | −32440.75797 | DD [5] | | | |
| 6 | −405.23012 | 3.939 | 1.59551 | 39.24 | 0.58043 |

TABLE 10-continued

Example 4: Lens Data

| Surface Number | Radius of Curvature | Distance | nd | vd | θgF |
|---|---|---|---|---|---|
| 7 | −46.61633 | 1.000 | 1.72916 | 54.68 | 0.54451 |
| 8 | −99.92995 | 2.800 | | | |
| 9 | −613.56320 | 1.010 | 1.59522 | 67.73 | 0.54426 |
| 10 | 29.81511 | 3.000 | 1.84666 | 23.78 | 0.62054 |
| 11 | 46.91136 | 3.549 | | | |
| 12 | −71.42841 | 1.000 | 1.83481 | 42.72 | 0.56486 |
| 13 | 173.10115 | DD [13] | | | |
| 14 | 81.36754 | 5.121 | 1.64000 | 60.08 | 0.53704 |
| 15 | −58.05855 | 0.150 | | | |
| 16 | 35.63695 | 7.010 | 1.49700 | 81.54 | 0.53748 |
| 17 | −44.63558 | 1.000 | 1.91082 | 35.25 | 0.58224 |
| 18 | 146.58133 | 2.000 | | | |
| 19 | 43.19398 | 7.010 | 1.63980 | 34.47 | 0.59233 |
| 20 | −24.82487 | 1.000 | 1.59551 | 39.24 | 0.58043 |
| 21 | 25.47397 | 2.681 | | | |
| 22 (stop) | ∞ | DD [22] | | | |
| 23 | 53.92651 | 5.000 | 1.49700 | 81.54 | 0.53748 |
| 24 | −78.38535 | 0.803 | | | |
| 25 | −33.76811 | 1.000 | 1.60562 | 43.71 | 0.57214 |
| 26 | −100.32701 | 1.500 | | | |
| 27 | 43.03999 | 1.010 | 1.80100 | 34.97 | 0.58642 |
| 28 | 22.43546 | 5.000 | 1.51742 | 52.43 | 0.55649 |
| 29 | −39.11154 | DD [29] | | | |
| 30 | 117.68560 | 1.000 | 1.61800 | 63.33 | 0.54414 |
| 31 | 17.30264 | 2.500 | | | |
| 32 | −156.38439 | 1.010 | 1.49700 | 81.54 | 0.53748 |
| 33 | 15.76729 | 4.276 | 1.66672 | 48.32 | 0.56101 |
| 34 | 104.68410 | DD [34] | | | |
| 35 | 660.95421 | 3.000 | 1.51742 | 52.43 | 0.55649 |
| 36 | −79.06941 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 11

Example 4: Items (d line)

| | Wide Angle | Intermediate | Telephoto |
|---|---|---|---|
| Zoom Ratio | 1.0 | 1.7 | 3.8 |
| f' | 102.916 | 178.233 | 388.034 |
| FNo. | 4.12 | 4.15 | 5.77 |
| 2ω (°) | 15.6 | 9.0 | 4.2 |

TABLE 12

Example 4: Distances Among Movable Surfaces

| | Wide Angle | Intermediate | Telephoto |
|---|---|---|---|
| DD [5] | 47.161 | 87.165 | 104.964 |
| DD [13] | 32.187 | 21.866 | 1.653 |
| DD [22] | 10.237 | 11.976 | 38.739 |
| DD [29] | 7.014 | 5.989 | 2.291 |
| DD [34] | 4.801 | 11.403 | 26.526 |
| DD [36] | 34.730 | 29.228 | 30.955 |

Figure 5:
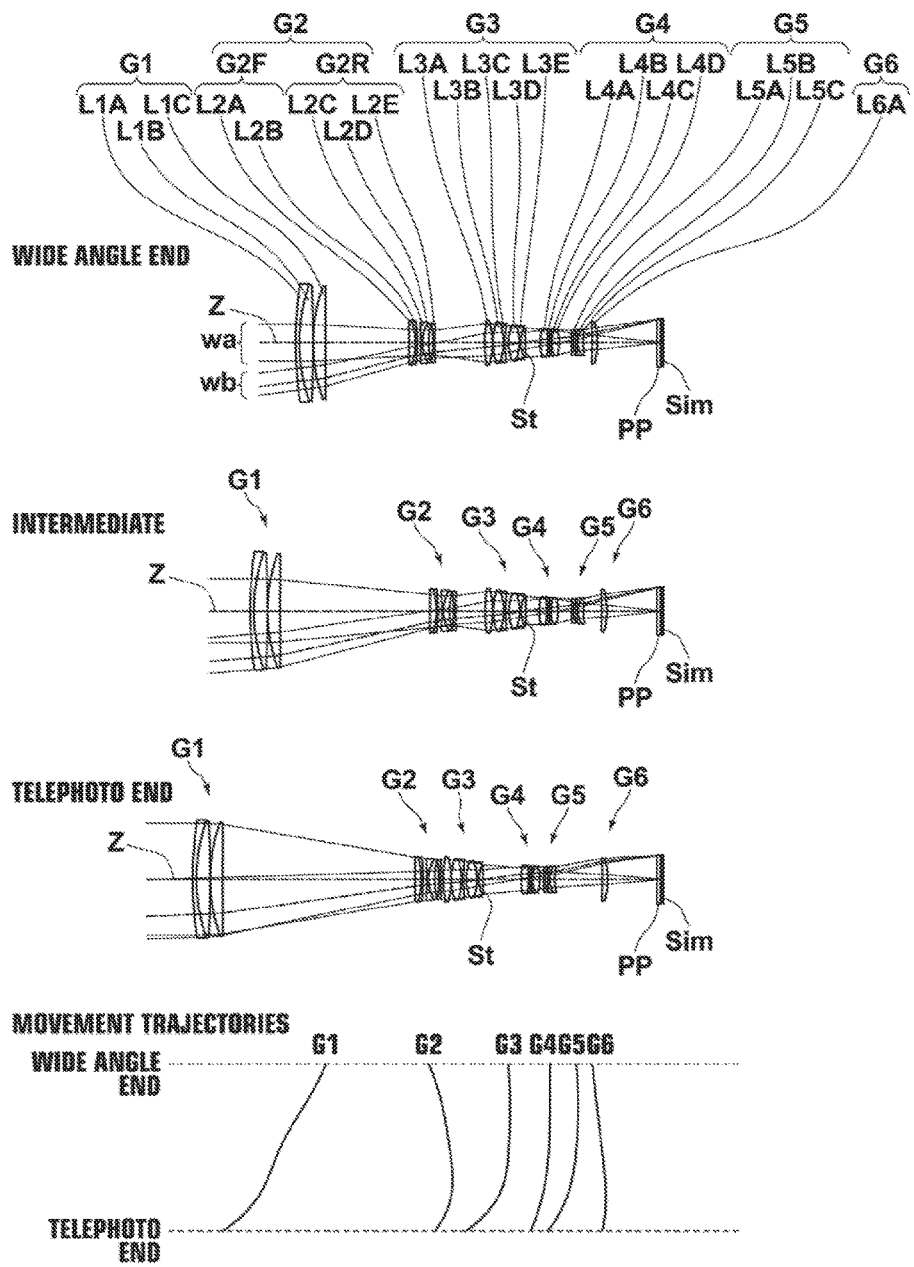
FIG. 5 is a collection of sectional diagrams that illustrate the configuration of a zoom lens according to Example 5.
Figure 13:
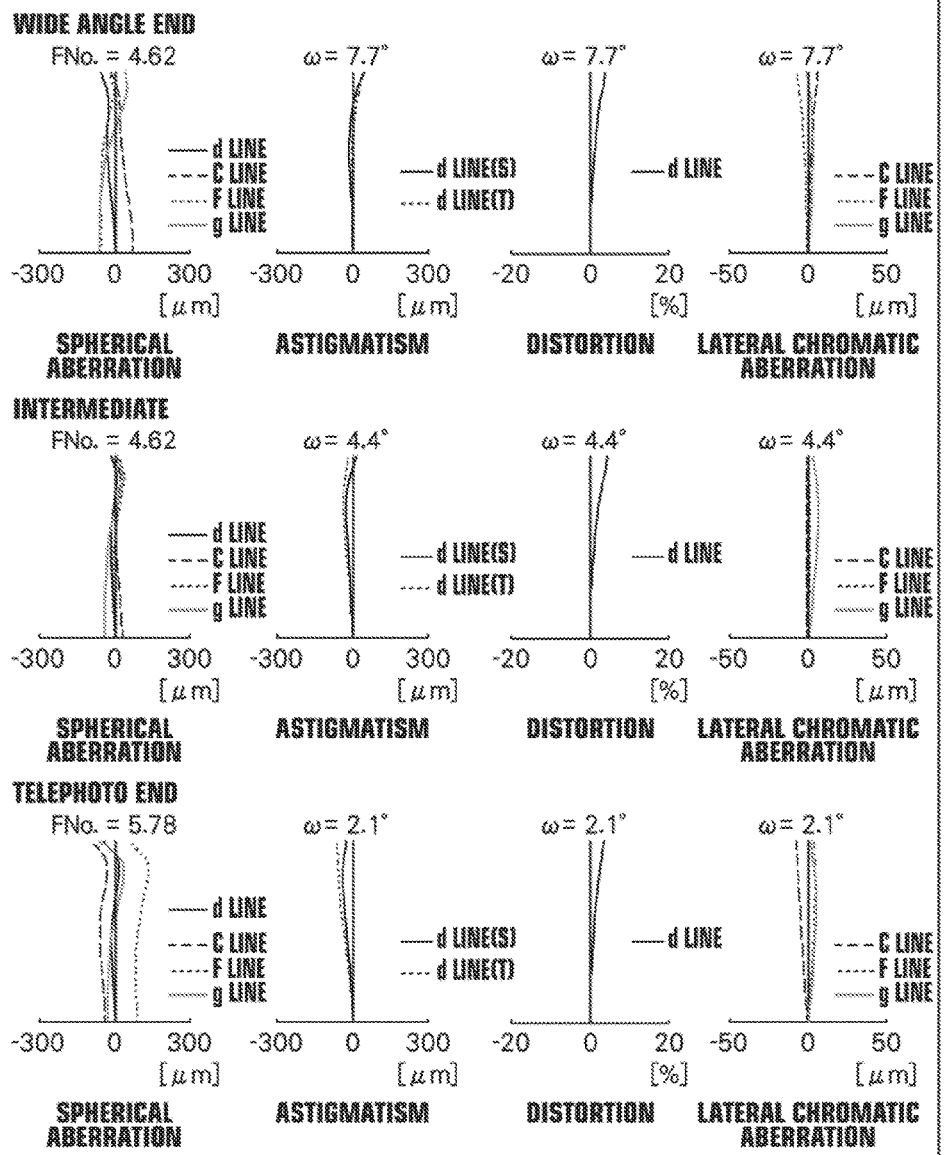
FIG. 13 is a collection of diagrams that illustrate aberrations of the zoom lens of Example 5.

Next, a zoom lens according to Example 5 will be described. FIG. 5 is a collection of sectional diagrams that illustrate the lens configuration of the zoom lens of Example 5. The number of lenses in each lens group within the zoom lens of Example 5 is the same as those for Example 1. Basic lens data are shown in Table 13, data related to various items are shown in Table 14, data related to the distances among movable surfaces are shown in Table 15, and various aberrations are illustrated in FIG. 13 for the zoom lens of Example 5.

TABLE 13

Example 5: Lens Data

| Surface Number | Radius of Curvature | Distance | nd | vd | θgF |
|---|---|---|---|---|---|
| 1 | 246.81462 | 2.220 | 1.83481 | 42.72 | 0.56486 |
| 2 | 107.73783 | 8.041 | 1.49700 | 81.54 | 0.53748 |
| 3 | −1178.90109 | 0.150 | | | |
| 4 | 100.44029 | 7.588 | 1.43875 | 94.94 | 0.53433 |
| 5 | 8727.25727 | DD [5] | | | |
| 6 | 3024.98867 | 3.778 | 1.62280 | 57.05 | 0.54640 |
| 7 | −45.65466 | 1.000 | 1.71299 | 53.87 | 0.54587 |
| 8 | −116.96443 | 2.300 | | | |
| 9 | −238.80952 | 1.010 | 1.72916 | 54.68 | 0.54451 |
| 10 | 23.51336 | 3.723 | 1.78472 | 25.68 | 0.61621 |
| 11 | 55.94830 | 2.570 | | | |
| 12 | −68.95561 | 1.000 | 1.81600 | 46.62 | 0.55682 |
| 13 | 274.76383 | DD [13] | | | |
| 14 | 81.51290 | 4.680 | 1.69680 | 55.53 | 0.54341 |
| 15 | −51.95789 | 0.150 | | | |
| 16 | 37.45190 | 6.447 | 1.49700 | 81.54 | 0.53748 |
| 17 | −35.34266 | 1.000 | 1.90043 | 37.37 | 0.57720 |
| 18 | 95.27503 | 2.000 | | | |
| 19 | 30.80965 | 6.418 | 1.65412 | 39.68 | 0.57378 |
| 20 | −29.75104 | 1.000 | 1.56732 | 42.82 | 0.57309 |
| 21 | 21.59194 | 2.620 | | | |
| 22 (stop) | ∞ | DD [22] | | | |
| 23 | 43.75714 | 4.404 | 1.53775 | 74.70 | 0.53936 |
| 24 | −56.69385 | 0.264 | | | |
| 25 | −40.80586 | 1.000 | 1.83400 | 37.16 | 0.57759 |
| 26 | 1196.79400 | 0.150 | | | |
| 27 | 46.19305 | 1.010 | 1.69680 | 55.53 | 0.54341 |
| 28 | 21.65972 | 4.255 | 1.51742 | 52.43 | 0.55649 |
| 29 | −39.14434 | DD [29] | | | |
| 30 | 168.89036 | 1.000 | 1.61800 | 63.33 | 0.54414 |
| 31 | 18.06237 | 1.718 | | | |
| 32 | 74.24649 | 1.010 | 1.49700 | 81.54 | 0.53748 |
| 33 | 14.51063 | 3.101 | 1.69700 | 48.52 | 0.55889 |
| 34 | 31.80102 | DD [34] | | | |
| 35 | −250.02232 | 3.000 | 1.58144 | 40.75 | 0.57757 |
| 36 | −49.91039 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 14

Example 5: Items (d line)

| | Wide Angle | Intermediate | Telephoto |
|---|---|---|---|
| Zoom Ratio | 1.0 | 1.7 | 3.8 |
| f' | 102.913 | 178.227 | 388.020 |
| FNo. | 4.62 | 4.62 | 5.78 |
| 2ω (°) | 15.4 | 8.8 | 4.2 |

TABLE 15

Example 5: Distances Among Movable Surfaces

| | Wide Angle | Intermediate | Telephoto |
|---|---|---|---|
| DD [5] | 49.840 | 89.688 | 115.040 |
| DD [13] | 30.478 | 18.097 | 1.637 |
| DD [22] | 9.119 | 8.194 | 22.721 |
| DD [29] | 7.515 | 8.383 | 2.292 |
| DD [34] | 5.566 | 11.100 | 28.523 |
| DD [36] | 35.737 | 30.040 | 29.656 |

Figure 6:
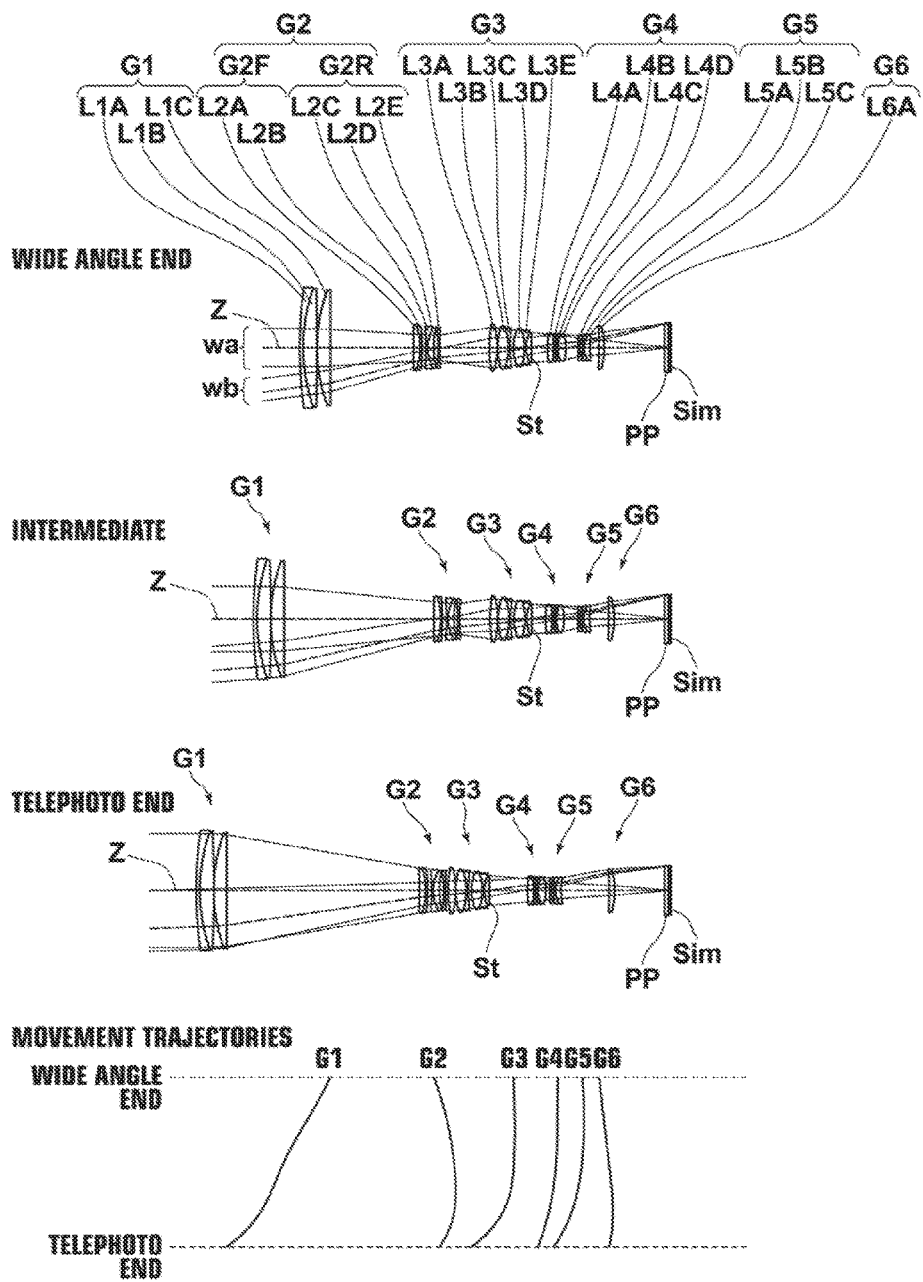
FIG. 6 is a collection of sectional diagrams that illustrate the configuration of a zoom lens according to Example 6.
Figure 14:
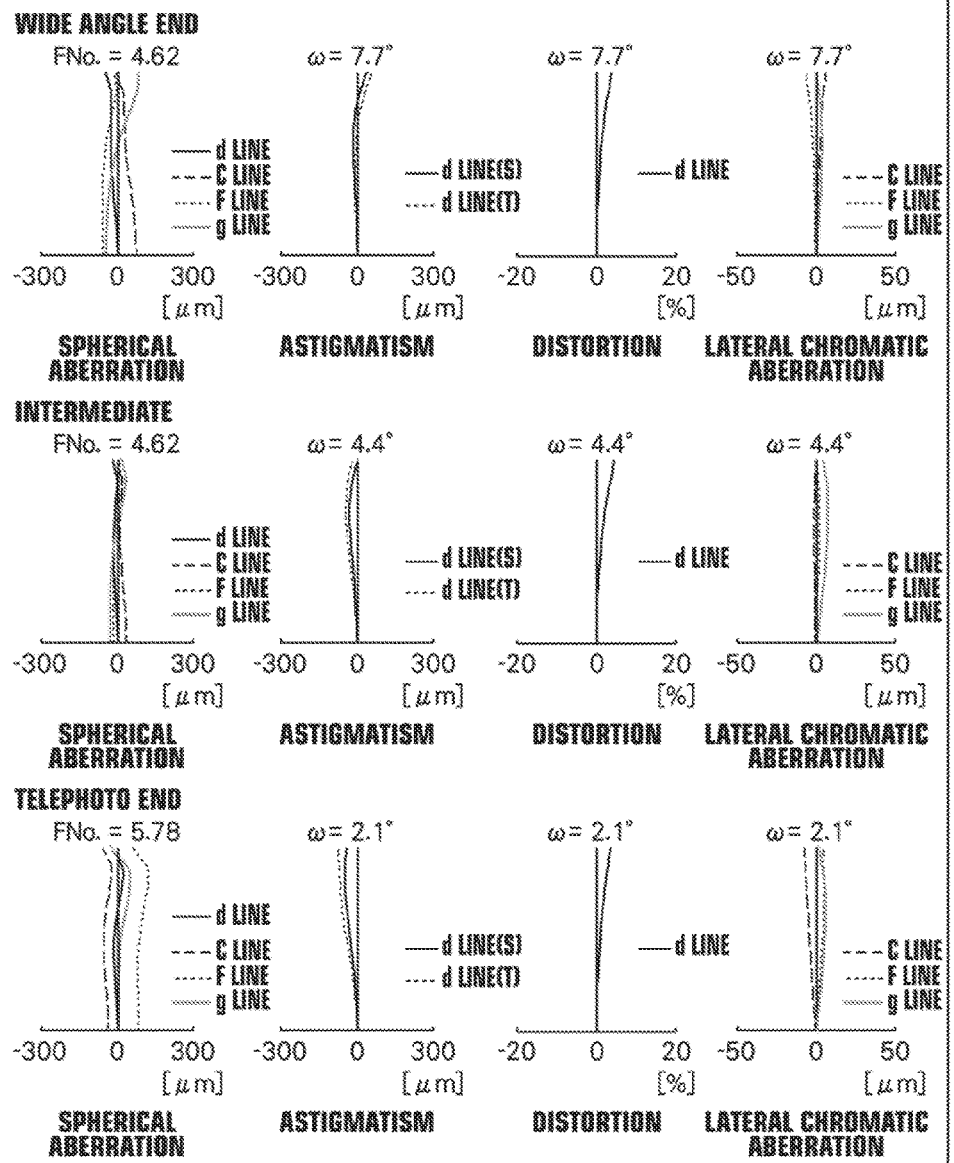
FIG. 14 is a collection of diagrams that illustrate aberrations of the zoom lens of Example 6.

Next, a zoom lens according to Example 6 will be described. FIG. 6 is a collection of sectional diagrams that illustrate the lens configuration of the zoom lens of Example 6. The number of lenses in each lens group within the zoom lens of Example 6 is the same as those for Example 1. Basic lens data are shown in Table 16, data related to various items are shown in Table 17, data related to the distances among movable surfaces are shown in Table 18, and various aberrations are illustrated in FIG. 14 for the zoom lens of Example 6.

TABLE 16

Example 6: Lens Data

| Surface Number | Radius of Curvature | Distance | nd | vd | θgF |
|---|---|---|---|---|---|
| 1 | 245.80950 | 2.220 | 1.83481 | 42.72 | 0.56486 |
| 2 | 107.21876 | 8.092 | 1.49700 | 81.54 | 0.53748 |
| 3 | −1141.17154 | 0.100 | | | |
| 4 | 100.21881 | 7.654 | 1.43875 | 94.94 | 0.53433 |
| 5 | 33201.75554 | DD [5] | | | |
| 6 | −1239.59270 | 3.888 | 1.65160 | 58.55 | 0.54267 |
| 7 | −41.76492 | 1.000 | 1.72916 | 54.68 | 0.54451 |
| 8 | −115.23571 | 2.425 | | | |
| 9 | −199.35565 | 1.010 | 1.72916 | 54.68 | 0.54451 |
| 10 | 23.60406 | 3.677 | 1.80518 | 25.42 | 0.61616 |
| 11 | 54.68729 | 2.600 | | | |
| 12 | −69.50409 | 1.000 | 1.78800 | 47.37 | 0.55598 |
| 13 | 258.80679 | DD [13] | | | |
| 14 | 85.79751 | 4.693 | 1.69680 | 55.53 | 0.54341 |
| 15 | −51.09839 | 0.100 | | | |
| 16 | 38.11402 | 6.458 | 1.49700 | 81.54 | 0.53748 |
| 17 | −36.18138 | 1.000 | 1.90043 | 37.37 | 0.57720 |
| 18 | 103.37686 | 2.000 | | | |
| 19 | 29.99892 | 6.510 | 1.65412 | 39.68 | 0.57378 |
| 20 | −31.15673 | 1.000 | 1.57501 | 41.50 | 0.57672 |
| 21 | 21.50234 | 3.015 | | | |
| 22 (stop) | ∞ | DD [22] | | | |
| 23 | 50.39261 | 3.623 | 1.59522 | 67.73 | 0.54426 |
| 24 | −62.84452 | 0.576 | | | |
| 25 | −39.96783 | 1.000 | 1.83400 | 37.16 | 0.57759 |
| 26 | 415.94560 | 0.100 | | | |
| 27 | 41.91854 | 1.010 | 1.67790 | 55.34 | 0.54726 |
| 28 | 20.11580 | 4.530 | 1.51742 | 52.43 | 0.55649 |
| 29 | −37.22510 | DD [29] | | | |
| 30 | 175.42627 | 1.000 | 1.61800 | 63.33 | 0.54414 |
| 31 | 18.81896 | 1.473 | | | |
| 32 | 75.02252 | 1.010 | 1.49700 | 81.54 | 0.53748 |
| 33 | 13.84323 | 3.383 | 1.61772 | 49.81 | 0.56035 |
| 34 | 34.75715 | DD [34] | | | |
| 35 | −250.01927 | 3.000 | 1.58144 | 40.75 | 0.57757 |
| 36 | −50.02712 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 17

Example 6: Items (d line)

| | Wide Angle | Intermediate | Telephoto |
|---|---|---|---|
| Zoom Ratio | 1.0 | 1.7 | 3.8 |
| f | 102.923 | 178.245 | 388.060 |
| FNo. | 4.62 | 4.62 | 5.78 |
| 2ω (°) | 15.4 | 8.8 | 4.2 |

TABLE 18

Example 6: Distances Among Movable Surfaces

| | Wide Angle | Intermediate | Telephoto |
|---|---|---|---|
| DD [5] | 49.385 | 88.916 | 113.805 |
| DD [13] | 29.808 | 17.927 | 1.644 |
| DD [22] | 9.485 | 8.115 | 22.489 |
| DD [29] | 7.405 | 8.241 | 2.295 |
| DD [34] | 5.476 | 11.478 | 28.535 |
| DD [36] | 35.816 | 30.022 | 29.729 |

Figure 7:
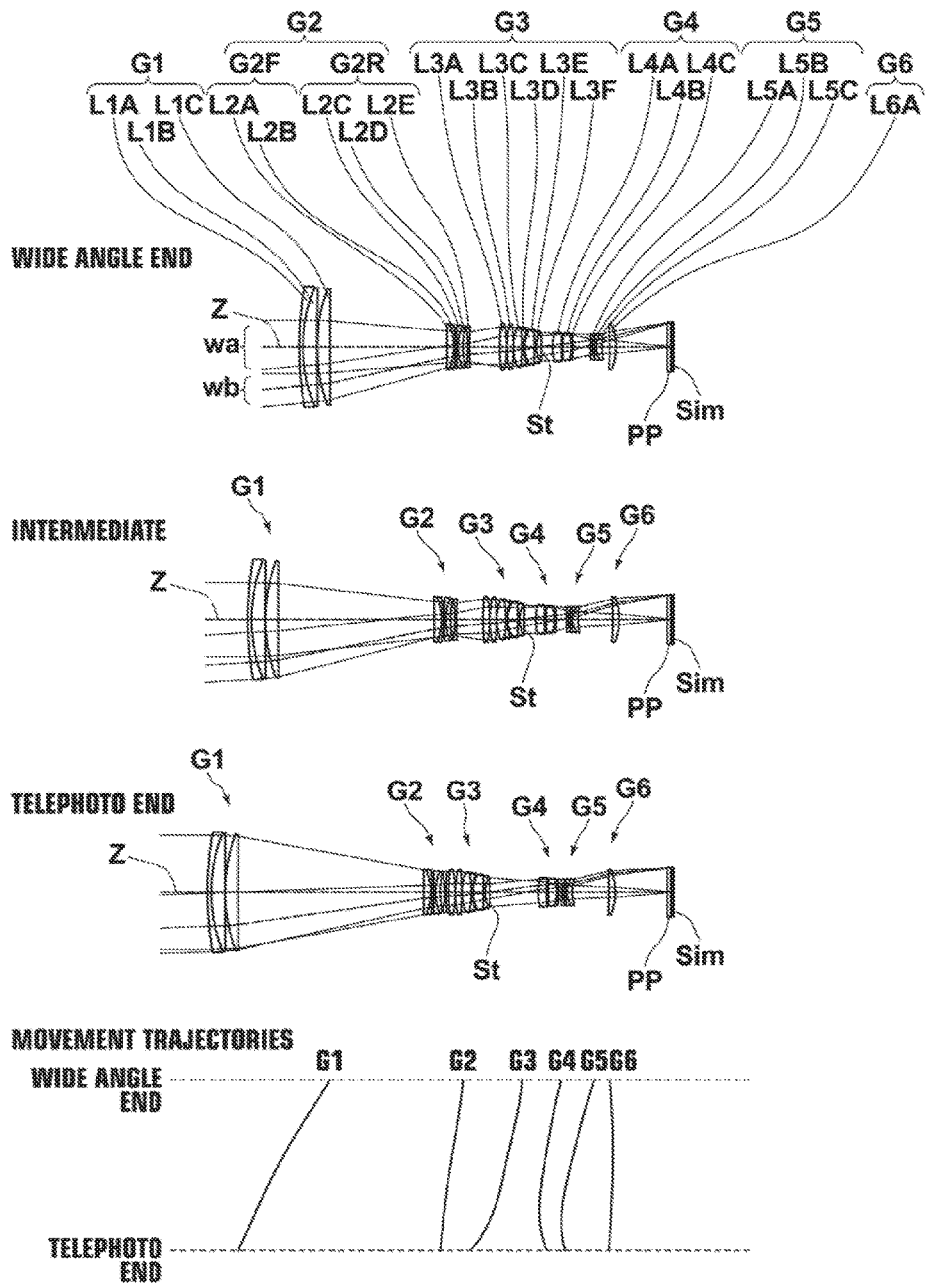
FIG. 7 is a collection of sectional diagrams that illustrate the configuration of a zoom lens according to Example 7.
Figure 15:
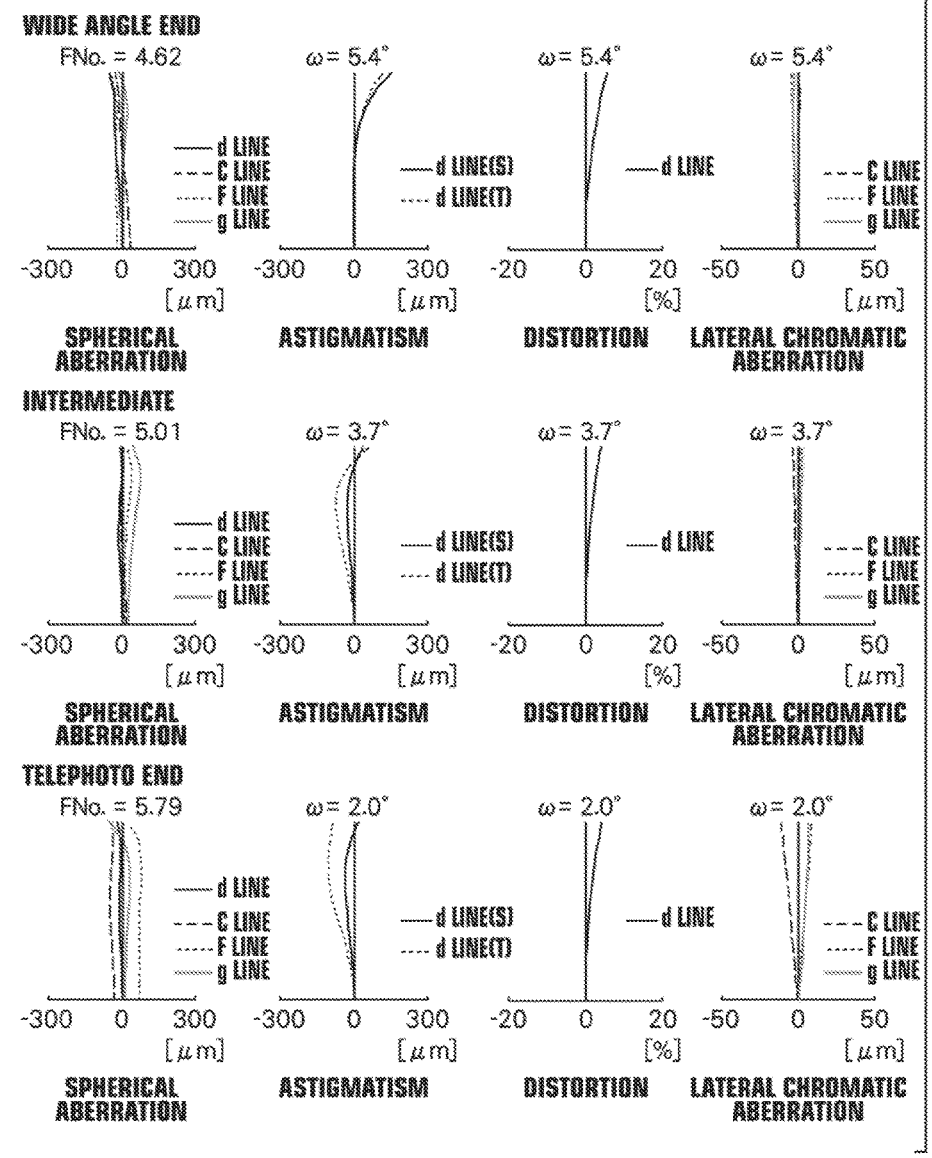
FIG. 15 is a collection of diagrams that illustrate aberrations of the zoom lens of Example 7.

Next, a zoom lens according to Example 7 will be described. FIG. 7 is a collection of sectional diagrams that illustrate the lens configuration of the zoom lens of Example 7. The number of lenses in each lens group within the zoom lens of Example 7 is the same as those for Example 1, except that a third lens group G3 is constituted by six lenses, which are lenses L3A through L3F, and a fourth lens group G4 is constituted by three lenses, which are lenses L4A through L4C. Basic lens data are shown in Table 19, data related to various items are shown in Table 20, data related to the distances among movable surfaces are shown in Table 21, and various aberrations are illustrated in FIG. 15 for the zoom lens of Example 7.

TABLE 19

Example 7: Lens Data

| Surface Number | Radius of Curvature | Distance | nd | vd | θgF |
|---|---|---|---|---|---|
| 1 | 205.08632 | 2.220 | 1.81600 | 46.62 | 0.55682 |
| 2 | 93.67079 | 8.130 | 1.49700 | 81.54 | 0.53748 |
| 3 | 2342.19599 | 0.100 | | | |
| 4 | 98.54896 | 7.622 | 1.49700 | 81.54 | 0.53748 |
| 5 | 3673.27806 | DD [5] | | | |
| 6 | −289.23356 | 4.022 | 1.74000 | 28.30 | 0.60790 |
| 7 | −36.10761 | 1.000 | 1.80000 | 29.84 | 0.60178 |
| 8 | −110.09634 | 0.800 | | | |
| 9 | 645.89060 | 1.010 | 1.81600 | 46.62 | 0.55682 |
| 10 | 29.78983 | 2.851 | 1.84666 | 23.78 | 0.62054 |
| 11 | 54.70693 | 2.724 | | | |
| 12 | −68.62504 | 1.000 | 1.78800 | 47.37 | 0.55598 |
| 13 | 182.50252 | DD [13] | | | |
| 14 | 99.12755 | 4.088 | 1.49700 | 81.54 | 0.53748 |
| 15 | −62.62395 | 0.100 | | | |
| 16 | 54.04337 | 3.841 | 1.68893 | 31.07 | 0.60041 |
| 17 | −167.10465 | 0.100 | | | |
| 18 | 31.95590 | 5.235 | 1.43875 | 94.94 | 0.53433 |
| 19 | −71.94599 | 1.000 | 2.00069 | 25.46 | 0.61364 |
| 20 | 35.97289 | 0.250 | | | |
| 21 | 21.83290 | 6.010 | 1.72342 | 37.95 | 0.58370 |
| 22 | −1067.02913 | 1.000 | 1.60738 | 56.82 | 0.54840 |
| 23 | 18.31437 | 2.848 | | | |
| 24 (stop) | ∞ | DD [24] | | | |
| 25 | 35.66698 | 5.000 | 1.51742 | 52.43 | 0.55649 |
| 26 | 138.42208 | 1.000 | | | |
| 27 | 102.65914 | 5.008 | 1.51742 | 52.43 | 0.55649 |
| 28 | −22.15929 | 1.000 | 1.74400 | 44.79 | 0.56560 |
| 29 | −43.98564 | DD [29] | | | |
| 30 | 249.15741 | 1.000 | 1.72916 | 54.68 | 0.54451 |
| 31 | 18.44686 | 1.340 | | | |
| 32 | 51.46462 | 1.010 | 1.65160 | 58.55 | 0.54267 |
| 33 | 13.37706 | 3.323 | 1.83481 | 42.72 | 0.56486 |
| 34 | 30.11090 | DD [34] | | | |
| 35 | −186.41513 | 3.668 | 1.60342 | 38.03 | 0.58356 |
| 36 | −37.12873 | DD [36] | | | |
| 37 | ∞ | 2.150 | 1.54763 | 54.99 | 0.55229 |

TABLE 19-continued

Example 7: Lens Data

| Surface Number | Radius of Curvature | Distance | nd | vd | θgF |
|---|---|---|---|---|---|
| 38 | ∞ | 0.700 | 1.49784 | 54.95 | 0.54959 |
| 39 | ∞ | 1.000 | | | |

TABLE 20

Example 7: Items (d line)

| | Wide Angle | Intermediate | Telephoto |
|---|---|---|---|
| Zoom Ratio | 1.0 | 1.5 | 2.7 |
| f | 144.132 | 217.169 | 388.166 |
| FNo. | 4.62 | 5.01 | 5.79 |
| 2ω (°) | 10.8 | 7.4 | 4.0 |

TABLE 21

Example 7: Distances Among Movable Surfaces

| | Wide Angle | Intermediate | Telephoto |
|---|---|---|---|
| DD [5] | 69.227 | 91.984 | 109.320 |
| DD [13] | 17.784 | 15.481 | 1.451 |
| DD [24] | 6.777 | 6.731 | 28.472 |
| DD [29] | 10.181 | 6.252 | 1.493 |
| DD [34] | 4.767 | 20.380 | 21.512 |
| DD [36] | 30.154 | 28.407 | 30.673 |

Figure 8:
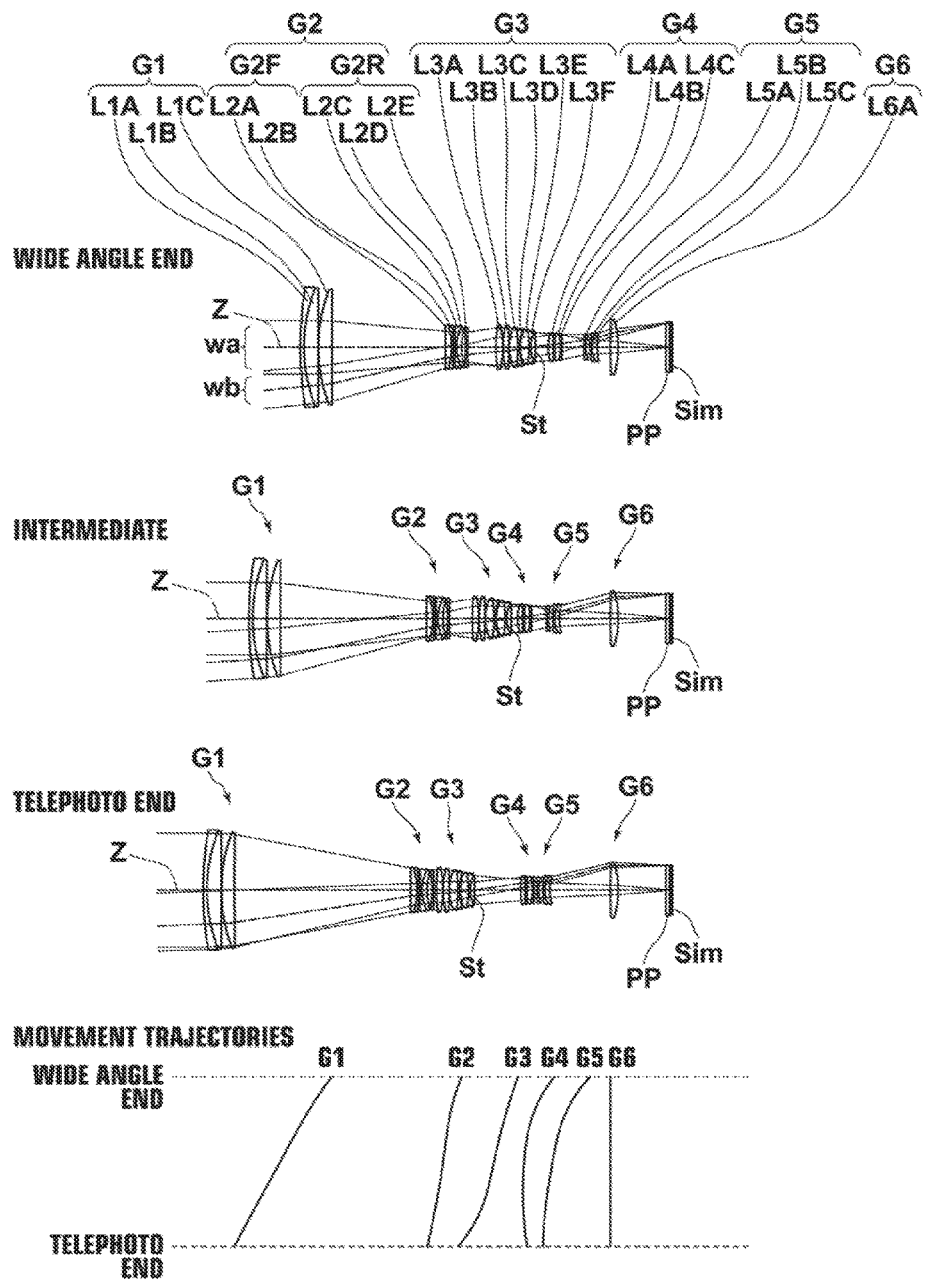
FIG. 8 is a collection of sectional diagrams that illustrate the configuration of a zoom lens according to Example 8.
Figure 16:
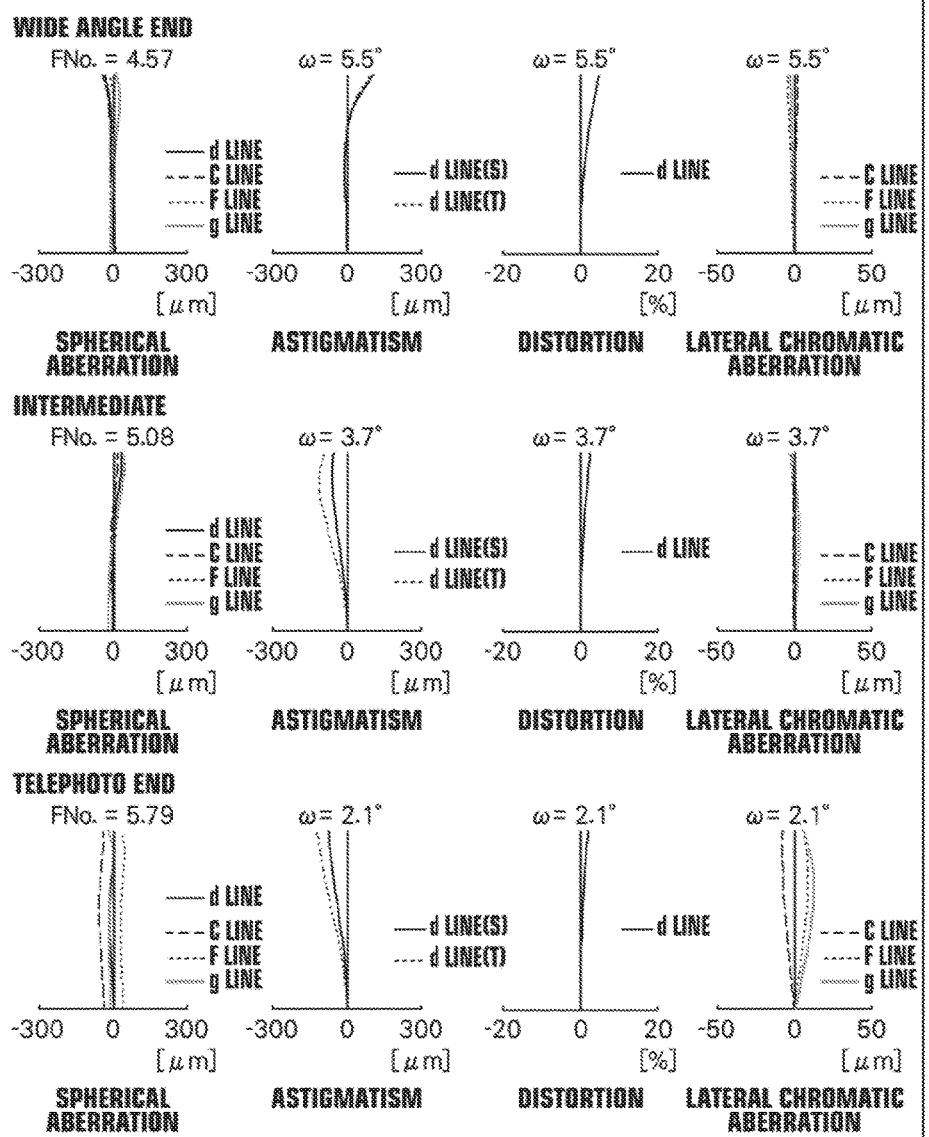
FIG. 16 is a collection of diagrams that illustrate aberrations of the zoom lens of Example 8.

Next, a zoom lens according to Example 8 will be described. FIG. 8 is a collection of sectional diagrams that illustrate the lens configuration of the zoom lens of Example 8. The number of lenses in each lens group within the zoom lens of Example 8 is the same as those for Example 7. Basic lens data are shown in Table 22, data related to various items are shown in Table 23 data related to the distances among movable surfaces are shown in Table 24, and various aberrations are illustrated in FIG. 16 for the zoom lens of Example 8.

TABLE 22

Example 8: Lens Data

| Surface Number | Radius of Curvature | Distance | nd | vd | θgF |
|---|---|---|---|---|---|
| 1 | 212.35539 | 2.220 | 1.81600 | 46.62 | 0.55682 |
| 2 | 95.18081 | 8.438 | 1.49700 | 81.54 | 0.53748 |
| 3 | -5352.69979 | 0.100 | | | |
| 4 | 97.19575 | 7.794 | 1.49700 | 81.54 | 0.53748 |
| 5 | 3569.72565 | DD [5] | | | |
| 6 | -1035.11505 | 3.647 | 1.73800 | 32.26 | 0.58995 |
| 7 | -43.87339 | 1.000 | 1.80100 | 34.97 | 0.58642 |
| 8 | -192.33037 | 1.000 | | | |
| 9 | -798.53909 | 1.010 | 1.72916 | 54.68 | 0.54451 |
| 10 | 25.08611 | 3.212 | 1.80518 | 25.42 | 0.61616 |
| 11 | 47.70304 | 2.731 | | | |
| 12 | -77.43380 | 1.000 | 1.91082 | 35.25 | 0.58224 |
| 13 | 406.69358 | DD [13] | | | |
| 14 | 95.54044 | 4.039 | 1.49700 | 81.54 | 0.53748 |
| 15 | -60.88528 | 0.100 | | | |
| 16 | 54.73332 | 3.551 | 1.58144 | 40.75 | 0.57757 |
| 17 | -222.60779 | 0.100 | | | |
| 18 | 29.15355 | 5.233 | 1.49700 | 81.54 | 0.53748 |
| 19 | -84.20866 | 1.000 | 1.91650 | 31.60 | 0.59117 |
| 20 | 31.50556 | 0.250 | | | |
| 21 | 22.36049 | 5.250 | 1.71700 | 47.93 | 0.56062 |
| 22 | -70.12504 | 1.000 | 1.65160 | 58.55 | 0.54267 |
| 23 | 19.36813 | 2.705 | | | |
| 24 (stop) | ∞ | DD [24] | | | |
| 25 | 35.91871 | 2.799 | 1.51742 | 52.43 | 0.55649 |
| 26 | 156.71491 | 1.000 | | | |
| 27 | 86.24955 | 3.482 | 1.51742 | 52.43 | 0.55649 |
| 28 | -29.49271 | 1.000 | 1.61405 | 54.99 | 0.55092 |
| 29 | -110.87437 | DD [29] | | | |
| 30 | 228.50744 | 1.000 | 1.75500 | 52.32 | 0.54765 |
| 31 | 21.26842 | 2.600 | | | |
| 32 | 64.84575 | 1.010 | 1.61800 | 63.33 | 0.54414 |
| 33 | 16.32979 | 3.042 | 1.80400 | 46.58 | 0.55730 |
| 34 | 34.04170 | DD [34] | | | |
| 35 | 423.63050 | 4.553 | 1.78800 | 47.37 | 0.55598 |
| 36 | -54.10936 | DD [36] | | | |
| 37 | ∞ | 2.150 | 1.54763 | 54.99 | 0.55229 |
| 38 | ∞ | 0.700 | 1.49784 | 54.95 | 0.54959 |
| 39 | ∞ | 1.000 | | | |

TABLE 23

Example 8: Items (d line)

| | Wide Angle | Intermediate | Telephoto |
|---|---|---|---|
| Zoom Ratio | 1.0 | 1.5 | 2.7 |
| f | 144.115 | 217.143 | 388.119 |
| FNo. | 4.57 | 5.08 | 5.79 |
| 2ω (°) | 11.0 | 7.4 | 4.2 |

TABLE 24

Example 8: Distances Among Movable Surfaces

| | Wide Angle | Intermediate | Telephoto |
|---|---|---|---|
| DD [5] | 67.325 | 86.464 | 104.178 |
| DD [13] | 16.789 | 13.866 | 1.475 |
| DD [24] | 7.697 | 3.807 | 27.092 |
| DD [29] | 12.949 | 8.729 | 1.496 |
| DD [34] | 7.996 | 30.300 | 36.010 |
| DD [36] | 28.165 | 28.165 | 28.165 |

Table 25 shows values corresponding to Conditional Formulae (1) through (6) for the zoom lenses of Examples 1 through 8. Note that all of the Examples use the d line as a reference wavelength, and the values shown in Table 25 are those with respect to the reference wavelength.

TABLE 25

| Formula Condition | | Example 1 | Example 2 | Example 3 | Example 4 | Example 5 | Example 6 | Example 7 | Example 8 |
|---|---|---|---|---|---|---|---|---|---|
| (1) | f2/f1 | -0.195 | -0.194 | -0.191 | -0.211 | -0.198 | -0.196 | -0.200 | -0.205 |
| (2) | f2/f3 | -0.754 | -0.763 | -0.772 | -0.738 | -0.777 | -0.777 | -0.778 | -0.750 |
| (3) | f2/f2R | 1.116 | 1.120 | 1.111 | 1.145 | 1.204 | 1.181 | 1.125 | 1.083 |
| (4) | f5/f1 | -0.168 | -0.164 | -0.175 | -0.172 | -0.153 | -0.155 | -0.136 | -0.156 |

TABLE 25-continued

| Formula | Condition | Example 1 | Example 2 | Example 3 | Example 4 | Example 5 | Example 6 | Example 7 | Example 8 |
|---|---|---|---|---|---|---|---|---|---|
| (5) | f5A/f5 | 1.013 | 1.021 | 0.956 | 0.966 | 1.065 | 1.108 | 1.057 | 1.108 |
| (6) | (vd5A + vd5B)/2 | 72.4 | 72.4 | 72.4 | 72.4 | 72.4 | 72.4 | 56.6 | 57.8 |

Based on the data above, it can be understood that all of the zoom lenses of Examples 1 through 8 satisfy Conditional Formulae (1) through (6), and that these zoom lenses are those in which various aberrations are favorably corrected.

Figure 17:
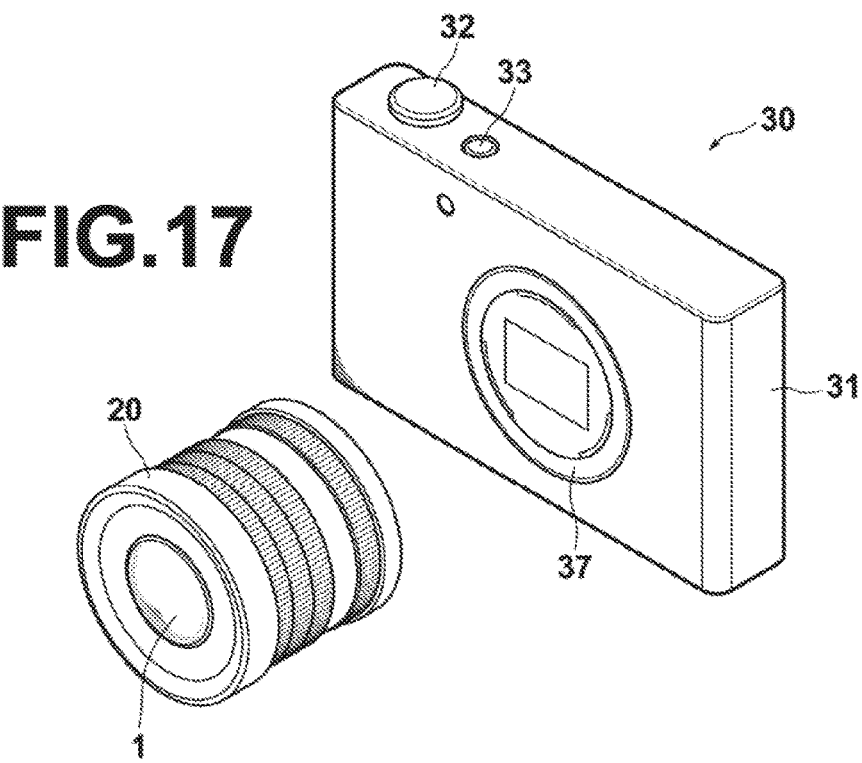
FIG. 17 is a perspective view that illustrates the front side of an imaging apparatus as an embodiment of the present disclosure.
Figure 18:
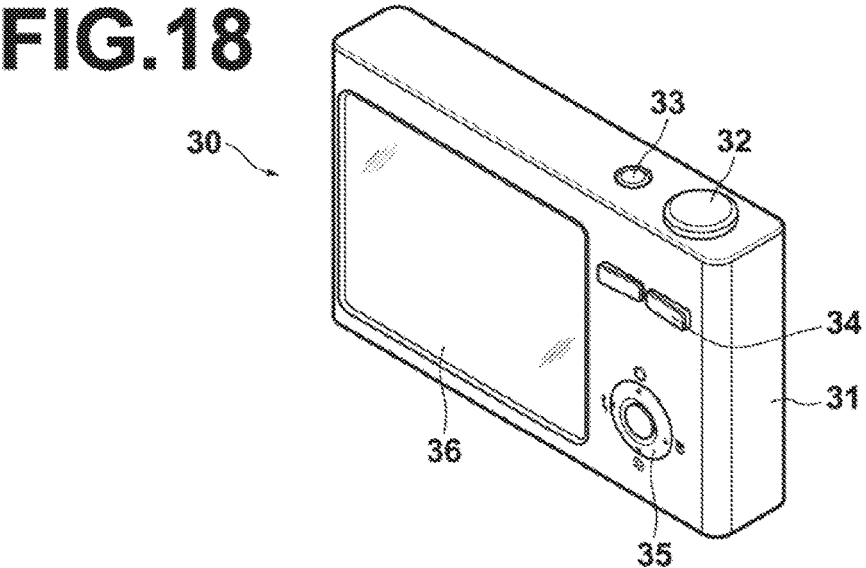
FIG. 18 is a perspective view that illustrates the rear side of the imaging apparatus illustrated in FIG. 17.

Next, an imaging apparatus according to an embodiment of the present disclosure will be described with reference to FIG. 17 and FIG. 18. FIG. 17 and FIG. 18 respectively are perspective views of the front and the rear of a camera 30. The camera 30 is a non reflex (so called mirrorless) digital camera, onto which an exchangeable lens 20 is interchangeably mounted. The exchangeable lens 20 is a zoom lens 1 according to an embodiment of the present disclosure housed in a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that receives images of subjects formed by the exchangeable lens 20 and outputs image signals corresponding to the images, a signal processing circuit (not shown) that processes the image signals output by the imaging element to generate images, and a recording medium (not shown) for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The camera 30 of the present embodiment is equipped with the zoom lens 1 of the present disclosure. Therefore, the camera 30 is capable of obtaining images having high image quality.

The present disclosure has been described with reference to the embodiments and Examples thereof. However, the zoom lens of the present disclosure is not limited to the embodiments and Examples described above, and various modifications are possible. For example, the values of the radii of curvature of each lens, the distances among surfaces, the refractive indices, and the Abbe's numbers are not limited to those shown in the Examples above, and may be other values.

In addition, a non reflex digital camera was described as the embodiment of the imaging apparatus. However, the present disclosure is not limited to this application, and may be applied to other imaging apparatuses, such as a video camera, digital cameras other than those of the non reflex type, a cinematic camera, and a broadcast camera.

What is claimed is:

1. A zoom lens consisting of, in order from the object side to the image side:
   a first lens group having a positive refractive power;
   a second lens group having a negative refractive power;
   a third lens group having a positive refractive power;
   a fourth lens group having a positive refractive power;
   a fifth lens group having a negative refractive power; and
   a sixth lens group having a positive refractive power;
   the first lens group moving toward the object side, the distance between the first lens group and the second lens group increasing, the distance between the second lens group and the third lens group decreasing, the distance between the third lens group and the fourth lens group changing, the distance between the fourth lens group and the fifth lens group changing, and the distance between the fifth lens group and the sixth lens group changing, when changing magnification from the wide angle end to the telephoto end;
   the first lens group consisting of, in order from the object side to the image side, a negative 1A lens, a positive 1B lens, and a positive 1C lens;
   the second lens group having a 2R lens group having a negative refractive power as a whole and consisting of a cemented lens formed by cementing a negative lens and a positive lens, which are provided in this order from the object side to the image side, together, and a negative single lens; and
   the fifth lens group consisting of, in order from the object side to the image side, a negative 5A lens, a negative 5B lens, and a positive 5C lens.

2. A zoom lens as defined in claim 1, in which Conditional Formula (1) below is satisfied:

$$-0.3 < f2/f1 < -0.1 \tag{1}$$

wherein f2 is the paraxial focal length with respect to the d line of the second lens group, and f1 is the paraxial focal length with respect to the d line of the first lens group.

3. A zoom lens as defined in claim 2, in which Conditional Formula (1-1) below is satisfied:

$$-0.25 < f2/f1 < -0.15 \tag{1-1}$$

4. A zoom lens as defined in claim 1, in which Conditional Formula (2) below is satisfied:

$$-0.9 < f2/f3 < -0.6 \tag{2}$$

wherein f2 is the paraxial focal length with respect to the d line of the second lens group, and f3 is the paraxial focal length with respect to the d line of the third lens group.

5. A zoom lens as defined in claim 4, in which Conditional Formula (2-1) below is satisfied:

$$-0.8 < f2/f3 < -0.7 \tag{2-1}$$

6. A zoom lens as defined in claim 1, wherein:
   the second lens group has a 2F lens group that includes a cemented lens formed by cementing a positive lens and a negative lens, provided in this order from the object side to the image side, together, adjacent to the 2R lens group at the object side thereof.

7. A zoom lens as defined in claim 1, in which Conditional Formula (3) below is satisfied:

$$0.8<f2/f2R<1.4 \quad (3)$$

wherein f2 is the paraxial focal length with respect to the d line of the second lens group, and f2R is the paraxial focal length with respect to the d line of the 2R lens group.

8. A zoom lens as defied in claim 7, in which Conditional Formula (3-1) below is satisfied:

$$1<f2/f2R<1.25 \quad (3\text{-}1).$$

9. A zoom lens as defined in claim 1, wherein:
the 2R lens group is moved in a direction perpendicular to the optical axis in order to correct for camera shake.

10. A zoom lens as defined in claim 1, wherein
the fifth lens group moves toward the image side when changing focus from that on an object at infinity to that on an object at a most proximal distance.

11. A zoom lens as defined in claim 1, in which Conditional Formula (4) below is satisfied:

$$-0.25<f5/f1<-0.05 \quad (4)$$

wherein f5 is the paraxial focal length with respect to the d line of the fifth lens group, and f1 is the paraxial focal length with respect to the d line of the first lens group.

12. A zoom lens as defined in claim 11, in which Conditional Formula (4-1) below is satisfied:

$$-0.2<f5/f1<-0.1 \quad (4\text{-}1).$$

13. A zoom lens as defined in claim 1, in which Conditional Formula (5) below is satisfied:

$$0.8<f5A/f5<1.3 \quad (5)$$

wherein f5A is the paraxial focal length with respect to the d line of the negative 5A lens, and f5 is the paraxial focal length with respect to the d line of the fifth lens group.

14. A zoom lens as defined in claim 13, in which Conditional Formula (5-1) below is satisfied:

$$0.9<f5A/f5<1.2 \quad (5\text{-}1).$$

15. A zoom lens as defined in claim 1, in which Conditional Formula (6) below is satisfied:

$$45<(vd5A+vd5B)/2<80 \quad (6)$$

wherein vd5A is the Abbe's number with respect to the d line of the negative 5A lens, and vd5B is the Abbe's number with respect to the d line of the negative 5B lens.

16. A zoom lens as defined in claim 15, in which Conditional Formula (6-1) below is satisfied:

$$50<(vd5A+vd5B)/2<75 \quad (6\text{-}1).$$

17. A zoom lens as defined in claim 1, wherein:
the third lens group has a 3A cemented lens, in which a positive lens and a negative lens provided in this order from the object side to the image side are cemented together, and a 3B cemented lens, in which a positive lens and a negative lens provided in this order from the object side to the image side are cemented together.

18. A zoom lens as defined in claim 1, further comprising:
a stop positioned adjacent to the third lens group at the image side thereof; and wherein:
the stop moves integrally with the third lens group when changing magnification.

19. A zoom lens as defined in claim 1, wherein:
the sixth lens group consists of a positive 6A lens.

20. An imaging apparatus equipped with the zoom lens as defined in claim 1.

* * * * *